US006782087B1

(12) United States Patent
Atkinson et al.

(10) Patent No.: US 6,782,087 B1
(45) Date of Patent: *Aug. 24, 2004

(54) DESKTOP TELEPHONY APPLICATION PROGRAM FOR A CALL CENTER AGENT

(75) Inventors: Wesley Atkinson, Woodland Park, CO (US); Richard McDuff, Colorado Springs, CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/934,167

(22) Filed: Sep. 19, 1997

(51) Int. Cl.[7] .................................................. H04M 3/42
(52) U.S. Cl. ........................... 379/210.01; 379/142.17; 379/218.01; 379/265.02; 379/265.09
(58) Field of Search ................................. 379/216, 355, 379/356, 354, 210.01, 218.01, 93.23, 93.17, 142.17, 265.02, 265.09

(56) References Cited

U.S. PATENT DOCUMENTS

| | | | |
|---|---|---|---|
| 3,643,034 A | 2/1972 | Burns et al. ............. 179/27 D |
| 4,455,455 A | 6/1984 | Little | |
| 4,510,351 A | 4/1985 | Costello et al. | |
| 4,782,521 A | * 11/1988 | Bartlett et al. ............. 379/355 |
| 4,797,911 A | 1/1989 | Szlam et al. .................. 379/67 |
| 4,829,563 A | 5/1989 | Crockett et al. ............ 379/309 |
| 4,837,799 A | 6/1989 | Prohs et al. ................ 379/224 |
| 4,881,261 A | 11/1989 | Oliphant et al. ............ 379/215 |
| 4,894,857 A | 1/1990 | Szlam et al. .................. 379/67 |
| 4,896,345 A | 1/1990 | Thorne ........................ 379/67 |
| 5,097,528 A | 3/1992 | Gursahaney et al. | |
| 5,099,510 A | 3/1992 | Blinken, Jr. et al. | |

(List continued on next page.)

FOREIGN PATENT DOCUMENTS

| | | | |
|---|---|---|---|
| CA | 2041882 | 5/1991 | |
| EP | O 340 665 A2 | 11/1989 | ............ H04M/3/36 |
| EP | 0535270 | 4/1993 | |
| EP | 0647050 | 4/1995 | |
| WO | WO 96/36157 | 11/1996 | |

OTHER PUBLICATIONS

Foard, C.F., "Teaming Switches and Computers for Customer Applications", AT&T Technology, vol. 6, No. 4, Jan. 1, 1991, pp. 32–38, XP000291998.

"CentreVu™ Solutions Management Tools for Enhancing Call Center Performance", Lucent Technologies, 1997.

Kanzow et al., "Dienste und Netze Fuer Die Multimedia–Kommunikation"; IT+IT Informationstechnik und Technische Informatik; vol. 36, No. 4/05, pp. 92–95, XP000468540.

*Engineering and Operations in the Bell System*, Bell Telephone Laboratories, Copyright 1977, pp. 503–504.

* cited by examiner

*Primary Examiner*—Bing Bui

(57) ABSTRACT

A desktop telephony application program enables a call center agent to handle calls. The application program may be interfaced with an answering service. The answering service acts as an application program interface (API) to a computer/telephony interface server and a call distributor. The application program produces a user interface that enables the agent to indicate when the agent is going on break and the type of break that the agent is taking. Additional functional elements are provided in the user interface to enable the agent to update status information regarding the current state of the agent. The application program may also provide phone books that hold phone numbers grouped by different logical grouping criteria.

18 Claims, 27 Drawing Sheets

U.S. PATENT DOCUMENTS

| | | | |
|---|---|---|---|
| 5,101,425 A | | 3/1992 | Darland et al. ................ 379/34 |
| 5,113,380 A | * | 5/1992 | Levine ........................ 379/74 |
| 5,155,763 A | | 10/1992 | Bigus et al. ................ 379/113 |
| 5,164,983 A | | 11/1992 | Brown et al. |
| 5,214,688 A | | 5/1993 | Szlam et al. ................. 379/67 |
| 5,226,120 A | | 7/1993 | Brown et al. |
| 5,247,569 A | | 9/1993 | Cave .......................... 379/113 |
| 5,270,919 A | | 12/1993 | Blake et al. |
| 5,289,368 A | | 2/1994 | Jordan et al. |
| 5,309,504 A | | 5/1994 | Morganstein |
| 5,309,505 A | | 5/1994 | Szlam et al. ................. 379/88 |
| 5,393,964 A | | 2/1995 | Hamilton et al. |
| 5,444,774 A | | 8/1995 | Friedes |
| 5,448,632 A | | 9/1995 | Iyob et al. |
| 5,452,350 A | | 9/1995 | Reynolds et al. |
| 5,457,738 A | * | 10/1995 | Sylvan ........................ 379/96 |
| 5,463,731 A | | 10/1995 | Diec et al. |
| 5,465,286 A | | 11/1995 | Clare et al. |
| 5,467,391 A | | 11/1995 | Donaghue, Jr. et al. .... 379/265 |
| 5,483,586 A | * | 1/1996 | Sussman ..................... 379/201 |
| 5,491,797 A | | 2/1996 | Thompson et al. |
| 5,499,291 A | | 3/1996 | Kepley |
| 5,506,897 A | | 4/1996 | Moore et al. |
| 5,511,117 A | | 4/1996 | Zazzera |
| 5,517,566 A | | 5/1996 | Smith et al. |
| 5,519,773 A | | 5/1996 | Dumas et al. |
| 5,535,256 A | | 7/1996 | Maloney et al. |
| 5,546,449 A | | 8/1996 | Hogan et al. |
| 5,577,112 A | | 11/1996 | Cambray et al. |
| 5,602,730 A | | 2/1997 | Coleman et al. |
| 5,621,789 A | | 4/1997 | McCalmont et al. |
| 5,623,540 A | | 4/1997 | Morrison et al. |
| 5,625,683 A | * | 4/1997 | Nazanin et al. ............. 379/355 |
| 5,675,630 A | | 10/1997 | Beatty |
| 5,675,637 A | | 10/1997 | Szlam et al. |
| 5,696,811 A | | 12/1997 | Maloney et al. |
| 5,703,943 A | | 12/1997 | Otto |
| 5,710,887 A | | 1/1998 | Chellaiah et al. |
| 5,715,307 A | | 2/1998 | Zazzera |
| 5,751,795 A | | 5/1998 | Hassler et al. |
| 5,757,904 A | | 5/1998 | Anderson |
| 5,761,502 A | | 6/1998 | Jacobs |
| 5,781,735 A | | 7/1998 | Southard |
| 5,784,452 A | | 7/1998 | Carney |
| 5,790,635 A | | 8/1998 | Dezonno |
| 5,790,798 A | | 8/1998 | Beckett, II et al. |
| 5,815,554 A | | 9/1998 | Burgess et al. |
| 5,815,566 A | * | 9/1998 | Ramot et al. ................ 379/265 |
| 5,818,907 A | | 10/1998 | Maloney et al. |
| 5,822,400 A | | 10/1998 | Smith |
| 5,838,682 A | | 11/1998 | Dekelbaum et al. |
| 5,848,356 A | * | 12/1998 | Jambhekar et al. ......... 455/403 |
| 5,850,433 A | * | 12/1998 | Rondeau ..................... 379/201 |
| 5,854,825 A | | 12/1998 | Mukaihara et al. |
| 5,864,616 A | | 1/1999 | Hartmeier |
| 5,867,495 A | | 2/1999 | Elliott et al. |
| 5,884,032 A | * | 3/1999 | Bateman et al. ............ 379/201 |
| 5,894,512 A | | 4/1999 | Zenner |
| 5,901,209 A | | 5/1999 | Tannenbaum et al. |
| 5,910,983 A | | 6/1999 | Dezonno et al. |
| 5,915,012 A | | 6/1999 | Miloslavsky |
| 5,926,538 A | | 7/1999 | Deryugin et al. |
| 5,933,492 A | | 8/1999 | Turovski |
| 5,946,375 A | | 8/1999 | Pattison et al. |
| 5,946,386 A | | 8/1999 | Rogers et al. |
| 5,970,134 A | | 10/1999 | Highland et al. |
| RE36,416 E | | 11/1999 | Szlam et al. |
| 5,991,390 A | | 11/1999 | Booton |
| 5,999,965 A | | 12/1999 | Kelly |
| 6,032,184 A | | 2/2000 | Cogger et al. |
| 6,055,308 A | | 4/2000 | Milosalvsky et al. |
| 6,058,163 A | | 5/2000 | Pattison et al. |
| 6,115,040 A | | 9/2000 | Bladow et al. |
| 6,134,318 A | | 10/2000 | O'Neil |
| 6,137,862 A | | 10/2000 | Atkinson et al. |
| 6,141,412 A | | 10/2000 | Smith et al. |
| 6,148,065 A | | 11/2000 | Katz |
| 6,148,074 A | | 11/2000 | Miloslavsky et al. |
| 6,192,121 B1 | | 2/2001 | Atkinson et al. |

DESKTOP TELEPHONY APPLICATION PROGRAM FOR A CALL CENTER AGENT

TECHNICAL FIELD

The present invention relates generally to telecommunication systems, and more particularly, to a desktop telephony application for a call center agent.

BACKGROUND OF THE INVENTION

Conventional systems include desktop application programs that control a telephone pad. These desktop application programs are able to dial an outbound call on behalf of a user. Such desktop application programs, however, are limited in several respects. These desktop application programs are not configurable to be integrated with an answering service so as to customize what calls are received. Second, these desktop application programs do not maintain status information about a user or agent who is using the desktop application program. Third, such desktop application programs either do not include a phone book or include a very limited phone book.

SUMMARY OF THE INVENTION

In accordance with a first aspect of the present invention, a method is practiced in a call center that has a call distributor for distributing calls and a telephony server for generating events regarding calling activities in the call system. The call center also includes an agent station that has a telephone set and an agent computer system. In accordance with this method, an interface is provided that enables the computer system to interface with the telephony server and the call distributor to collect call information and events. A client application program is provided on the agent computer system to receive events from the interface and that produce a user interface on the display device for enabling the agent to handle calls. The client application is registered with the interface so the agent receives calls having only selected characteristics (such as selected DNIS values). A call is then received at the agent station that exhibits the selected characteristics.

In accordance with another aspect of the present invention, multiple phone books are provided for use by a user of a computer system. Each phone book contains entries that list phone numbers. The phone books include at least two phone books that include different logical groupings of entries. Contents of a selected one of the phone books is displayed on the display device. The user accesses the displayed contents of the selected phone book to cause an outbound call to be placed to a phone number that is listed in an entry that is part of the displayed contents of the selected phone book.

In accordance with a further aspect of the present invention, state information is maintained regarding whether an agent in a call center is working or on break. Information is also maintained regarding what type of break the agent is taking. A user interface is generated on the display device with an application program. The user interface includes an element for the agent to indicate that the agent is taking a break and for indicating the type of break that the agent is taking. The state information is updated in response to the agent using the user interface to indicate that the agent is on break and to indicate the type of break the agent is taking.

BRIEF DESCRIPTION OF THE DRAWINGS

A preferred embodiment of the present invention will be described below relative to the following figures:

FIG. 8A depicts the format of a new style autofone window after an agent initially logs on.

FIG. 8B depicts the format of a old style autofone window after an agent initially logs on.

DETAILED DESCRIPTION OF THE INVENTION

The preferred embodiment of the present invention provides a desktop application program for use by an agent in a call center. The desktop application program controls a telephone pad and enables the agent to receive calls and place outbound calls. The desktop application program produces a user interface that resembles the face of a telephone with certain functional buttons. Through this user interface, the user may login, logout, accept calls, place calls, log breaks, update status information and access phone books. The user interface is configured so as to not occupy a great deal of screen real-estate and is intuitive to use.

The desktop application program of the preferred embodiment of the present invention enables an agent to log breaks. In addition, it enables an agent to log the type of break that the agent is taking. For example, the agent may specify that the agent is at lunch, is in a meeting, is in training, or is on a coffee break. The break information is tied to a database that maintains the status of agents and their breaks for use by a monitoring system.

As was mentioned above, an agent may access a phone book via the user interface of the desktop application program. The preferred embodiment of the present invention provides the agent with three types of phone books. The personal phone book stores frequently called numbers. The yellow pages phone book stores numbers for various businesses and customers and the Call Backs phone book stores numbers which the agent wishes to call back at a later time. This segregation of phone numbers into separate phone books enables the agent to quickly locate the phone number that the agent needs.

Figure 1:
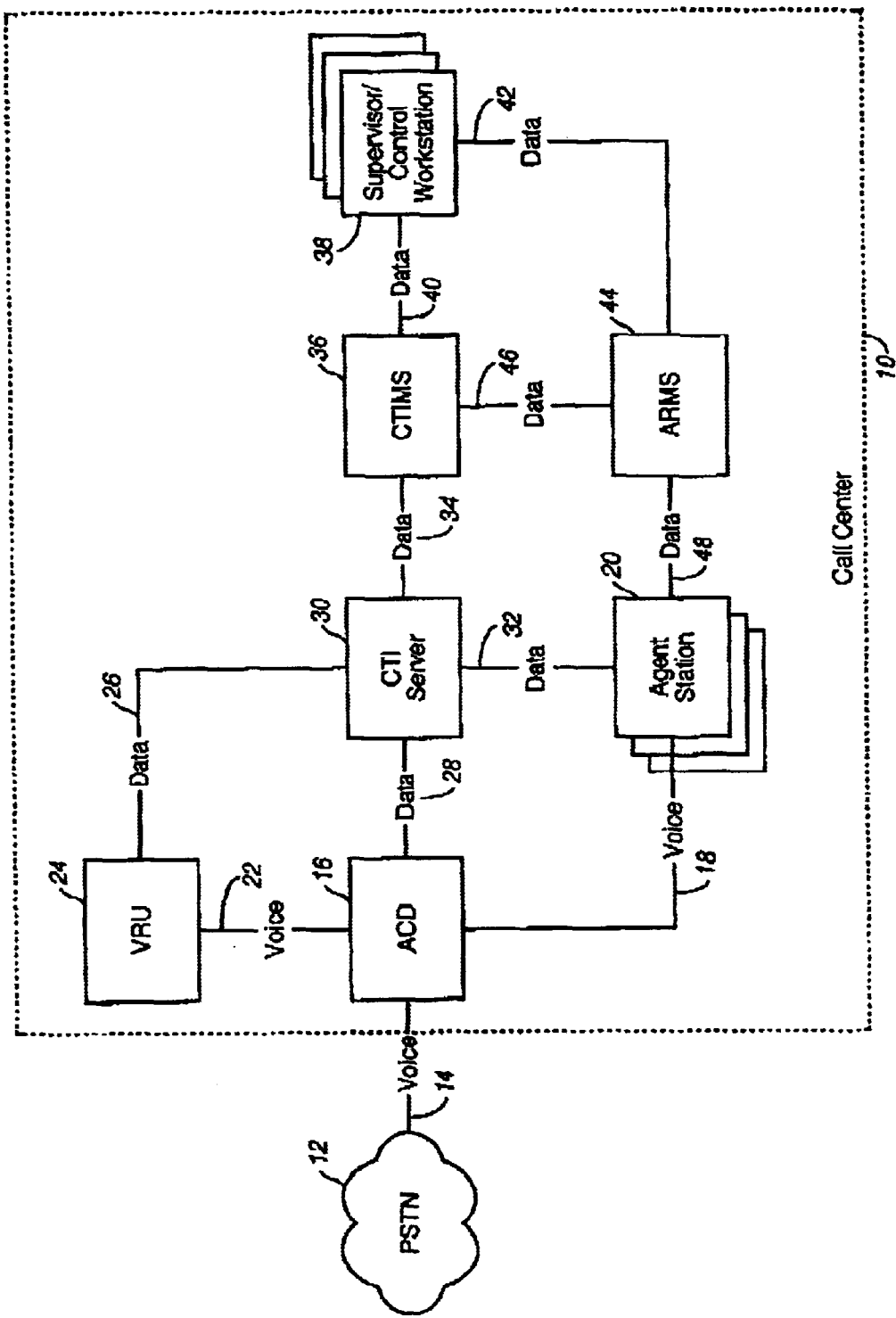
FIG. 1 is a block diagram for a portion of a telecommunications system that is suitable for practicing the preferred embodiment in the present invention.

FIG. 1 is a block diagram that illustrates a portion of a telecommunications network that is suitable for practicing the preferred embodiment of the present invention. The telecommunications network includes a call center 10 that is connected to a public switched telephone network (PSTN) 12 via a voice trunk 14. The call center 10 includes an automatic call distributor (ACD) 16 or other switching mechanism for routing incoming calls within the call center. The ACD 16 is connected via a voice trunk 18 to agent stations 20. Agents are stationed at the stations 20 to handle calls on behalf of the call center. The ACD 16 is also connected via a voice trunk 22 to a voice response unit (VRU) 24 that automates call processing. The VRU 24 may be used to collect information from a caller. For example, the VRU 24 may be used to collect an account number, a credit card number and/or a service request from a caller. The VRU 24 is connected to a computer/telephony integration (CTI) server 30 via a data link 26. The CTI server 30 extracts call data from the ACD 16. In particular, the CTI server 30 abstracts raw call data from the ACD 16 into useful statistical data. The CTI server 30 also distributes data in the form of events. The CTI server 30 may run as a separate process on a dedicated computer system. A suitable CTI server is the T Server produced by Genesys Labs of San Bruno, Calif. The CTI server 30 is connected to the ACD via a data link 28 and is also connected to the agent stations 20 via a data link.

A CTI monitoring server (CTIMS) 36 is connected to the CTI server 30 via a data link 34. CTIMS 36 may be implemented on a shared computer with the CTI server 30 or on a separate dedicated computer system. CTIMS serves to compile statistical data that is collected from the CTI server 30 into useful data for presentation and management at the supervisor/control workstations 38. This data is utilized by a client application program that is run on the supervisor/control workstations 38. This client application program is described in more detail in co-pending application entitled, "Monitoring System Client For A Call Center," which is assigned to a common assignee with the present application and which is explicitly incorporated by reference herein.

CTIMS registers with the CTI server 30 to receive all events that are output by the CTI server 30. An example of events that are output by the CTI server 30 include events indicating calls received, calls routed, calls answered and calls disconnected. CTIMS 36 categorizes the events into groups, such as by agent, by agent group, by call center, by business type, and the like. CTIMS also calculates certain statistics such as average call handling times. A suitable implementation of CTIMS is described in co-pending application entitled, "Computer/Telephony Integration Monitoring Server," which is assigned to a common assignee with the present application and which is explicitly incorporated by reference herein.

CTIMS 36 is connected to an automated resource management system (ARMS) 44 via a data link 46. ARMS 44 provides management of resource data for the call center 10. ARMS is largely a database on a server that contains interfaces for access by CTIMS 36, by agent stations 20 and by supervisor/control workstations 38. A suitable implementation of ARMS 44 is described in co-pending application entitled, "AUTOMATED RESOURCE MANAGEMENT SYSTEM (ARMS) FOR A CALL CENTER,", Ser. No. 08/990,548 which assigned to a common assignee with the present application and which is explicitly incorporated by reference herein.

It should be appreciated that the data links 26, 32, 34, 40, 42 and 48 may all be implemented as local area network (LAN) connections. These data links may also be implemented as non-networked links. Those skilled in the art will appreciate that a call center 10 used to practice the present invention may have a different configuration than that depicted in FIG. 1.

Figure 2:
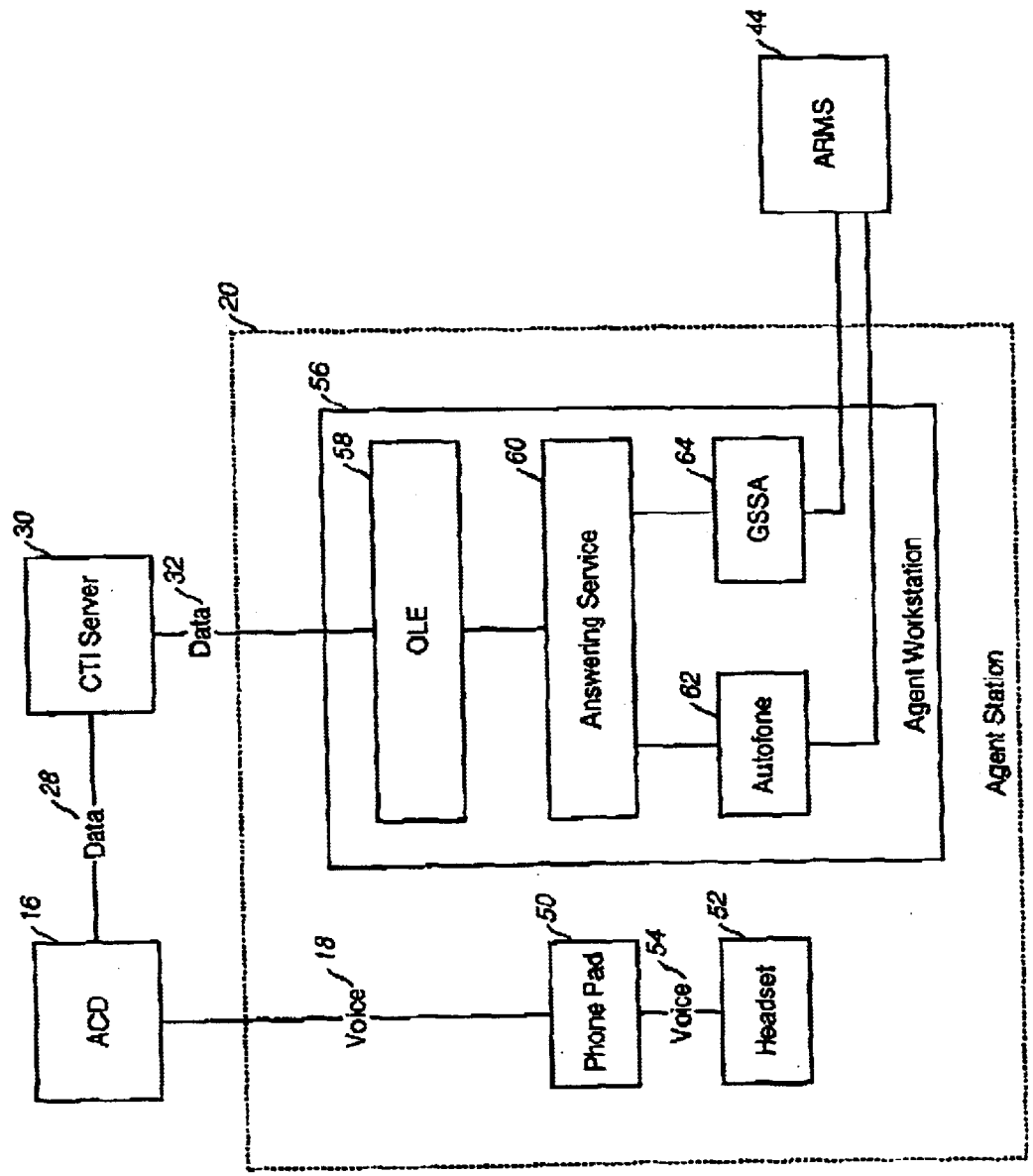
FIG. 2 is a block diagram illustrating an agent station in more detail.

FIG. 2. depicts a logical, view of an agent station 20 that is suitable for practicing the preferred embodiment of the present invention. The agent station 20 is connected to ACD 16 via voice trunk 18. The agent station 20 is also connected to the CTI server 30, via a data link 32 and is connected to ARMS 44. The agent station 20 includes a phone pad 50 that may be used to place outbound calls. The phone pad 50 is connected via a voice trunk 54 to a headset 52 that the agent may use to listen and speak on the telephone call. The agent station 20 also includes an agent workstation 56, which may be implemented as a personal computer system, a workstation or other suitable computer system (see FIG. 3). The agent workstation includes support for the Microsoft® OLE protocol 58 from Microsoft Corporation of Redmond, Wash. The agent station 20 also includes an answering service that serves as a single common application program interface (API) for desktop applications to interface with the CTI server 30 and the ACD 16. A suitable implementation of the answering service is described in more detail in co-pending application entitled, "TELEPHONY SERVER APPLICATION PROGRAM INTERFACE (API)," Ser. No. 08/934,166 which was filed on even date herewith, which is assigned to a common assignee with the present application and which is explicitly incorporated by reference herein.

The agent workstation 56 includes the desktop application program of the preferred embodiment of the present invention, which will be referred to hereinafter as "autofone." Autofone 62 will be described in more detail below. The agent workstation 56 also includes a generic sales and service application (GSSA) 64. GSSA 64 is a configurable application platform that performs customer sales and service processing for different business clients. GSSA 64 is used by agents to service customer calls. A suitable implementation of GSSA is described in more detail in co-pending application entitled, "CONFIGURABLE APPLICATION PROGRAM FOR CALL CENTER SALES AND SERVICES," Ser. No. 08/933,767 which was filed on even date herewith, which is assigned to a common assignee with the present application and which is explicitly incorporated by reference herein.

Those skilled in the art will appreciate that the agent station configuration depicted in FIG. 2 is intended to merely illustrative. The present invention may be practiced with a different configuration. Moreover, the agent workstation 56 need not include support for Microsoft® OLE, the answering service 60 and GSSA 64. These components are shown merely as illustrative components of the preferred embodiment of the present invention.

Figure 3:
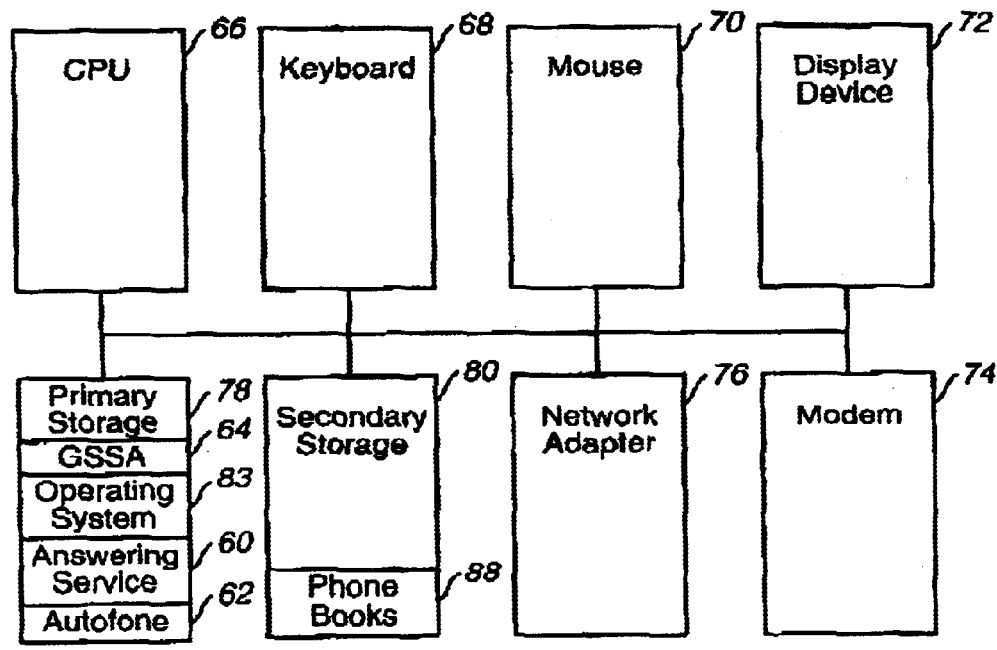
FIG. 3 is a block diagram of an agent workstation.

FIG. 3 shows a block diagram of the architecture for the agent workstation 56. The agent workstation 56 includes a central processing unit (CPU) for managing an overseeing operation. The agent workstation 56 may also include a number of peripheral devices, including a keyboard 68, a mouse 70 and a display device 72, such as a video display device. The agent workstation 56 may also include a modem 74 for interfacing with telephone lines and a network adapter 76 for interfacing with a network. The agent workstation 56 includes primary storage 78 and secondary storage 80. The primary storage 78 includes an operating system 82, such as the Microsoft® Windows® 95 operating system or the Microsoft® Windows® NT operating system. The primary storage also holds the answering service 60, GSSA 64, and autofone 62. The secondary storage 80 may hold a number of types of data and programs. FIG. 3 shows an instance wherein the phone books 88 are stored in secondary storage 80. Nevertheless, the phone books may be stored on a remote server, such as ARMS 44.

Figure 4:
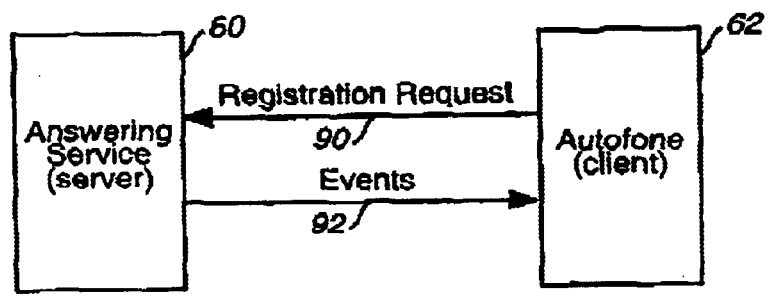
FIG. 4 is a logical diagram illustrating the data flow between the answering service and autofone.
Figure 5:
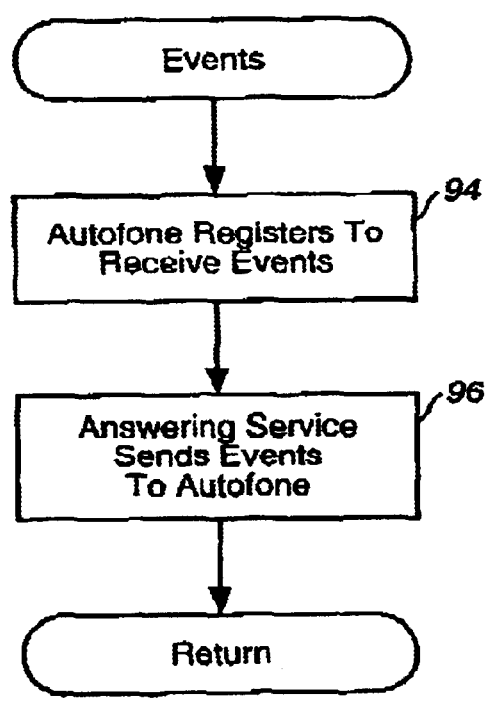
FIG. 5 is a flow chart illustrating the steps that are performed for autofone to receive events from the answering service.

As is shown in FIG. 4, autofone 62 is run as a client of the answering service 60, which acts as a server. Autofone 62 may be implemented as an application program in a suitable language, such as Visual Basic. The answering service 60 may be implemented as an OLE automation server. Autofone 62 registers for specific dialed number identification service (DNIS) values with the answering service 60 by submitting registration requests 90 (see step 94 in FIG. 5). Events 92 for the specified DNIS are subsequently sent to autofone 62 from the answering service 60 when the events occur (step 96 in FIG. 5).

This registration methodology provides an added degree of configurability for autofone 62. Autofone 62 may be registered to receive and process all calls to a given agent workstation 56. On the other hand, autofone 62 may be registered only to receive calls for one or more DNIS values. In the preferred embodiment of the present invention, each DNIS value is associated with a given business client of the call center. Thus, an agent may be designated to receive only calls for a subset of the business clients as specified by the DNIS values. The registration methodology enables autofone 62 for the agent to register solely for calls for the designated business clients when a given agent is logged on to autofone. Moreover, a different agent can log on to the same agent workstation but be registered to receive different DNIS events and, thus, facilitate time sharing of the agent workstation.

Figure 6:
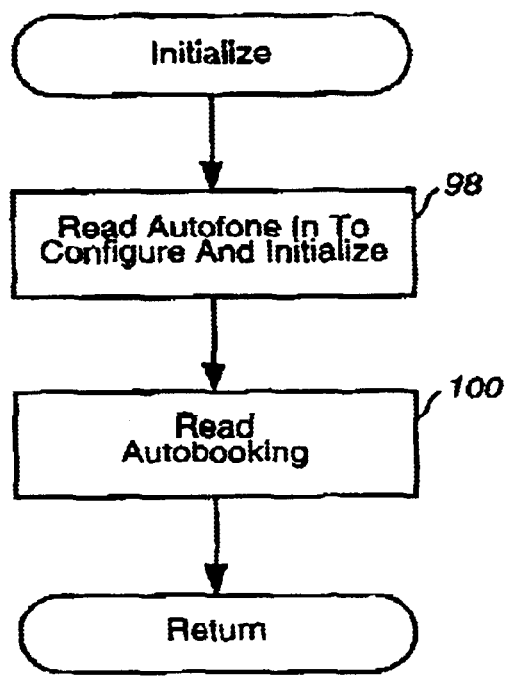
FIG. 6 is a flow chart illustrating the steps that are performed by autofone during initialization.

Autofone 62 utilizes two initialization files (i.e., .ini files). These two .ini files are autofone.ini and autobook.ini. When autofone 62 is first initialized, it reads the autofone.ini file to configure itself and initialize itself (step 98 in FIG. 6). The autofone.ini file contains a data source name for the ARMS 44 database, contains a user ID for the ARMS database and contains a password for the ARMS user ID. The autofone.ini file also contains a default style for the autofone window produced by autofone 62 (which will be described in more detail below). The autobook.ini file contains the name of the file which stores the agent phone book names. The autobook.ini file is read to locate the phone books to be used by autofone 62.

Figure 7:
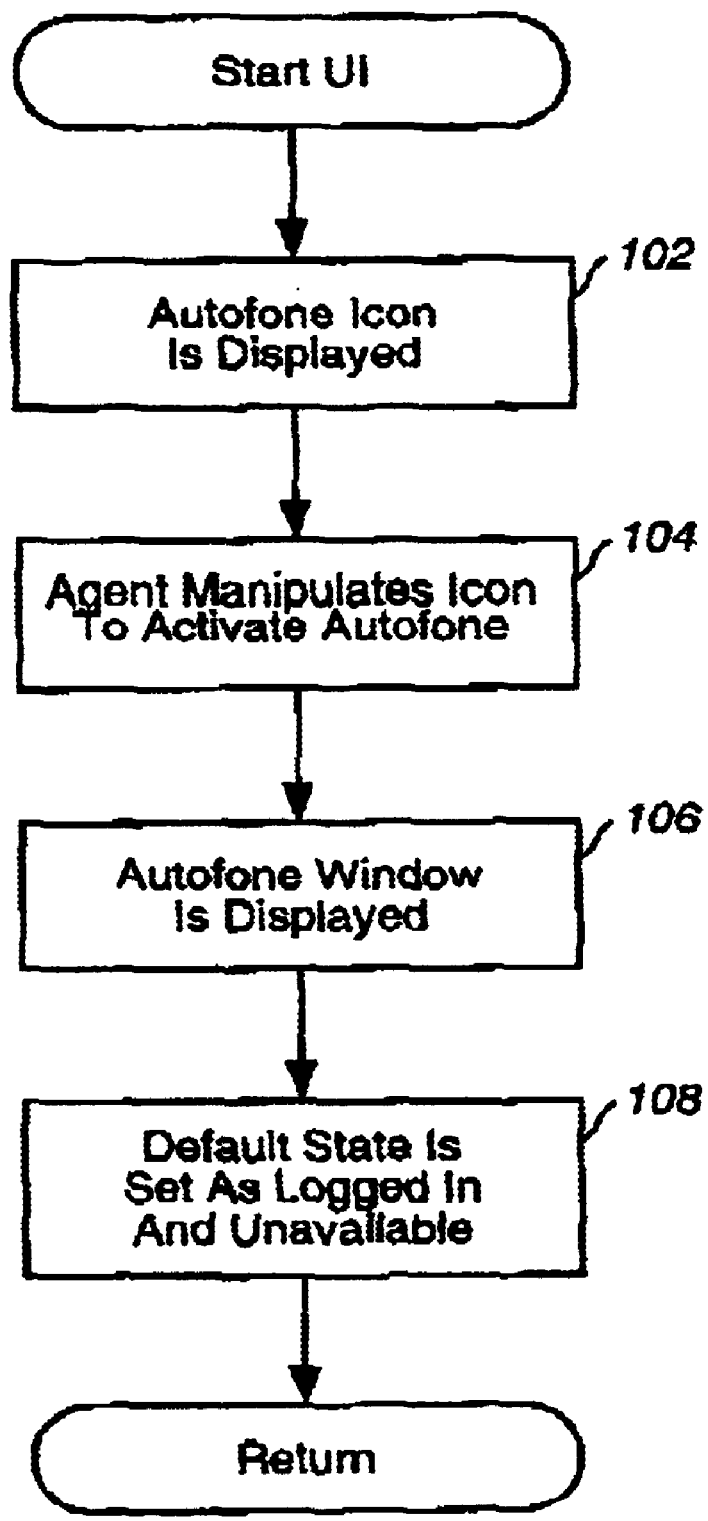
FIG. 7 is a flow chart illustrating the steps that are performed to cause the initial autofone window to be displayed.

FIG. 7 is a flow chart illustrating the steps that are performed to provide the user interface for autofone 62. Initially, a window for autofone 62 is not open and a program icon for autofone is displayed on the desktop of the user (step 102 in FIG. 7). The icon may constitute a shortcut icon, such as found in the Microsoft® Windowsg 95 operating system. The agent then manipulates the icon to activate autofone (step 104 in FIG. 7). This may entail the agent positioning a mouse cursor to point at the icon and clicking or double clicking on the icon. The initial autofone window is displayed (see FIGS. 8A and 8B) in response (step 106 in FIG. 7) and the default state for the agent is set as logged in and unavailable (step 108 in FIG. 7).

It should be appreciated that information about the state of an agent is maintained in tables stored in ARMS 44. In general, an agent may be in one of the following states: unavailable, available, call work, error, or unknown. When the agent is unavailable, the agent is not available for processing calls. When the agent is available, the agent is not currently processing a-call and is available to process calls. When the agent is in an error state, an error has occurred such that the state information may not be reliable. An agent may be in an unknown state wherein the current state of the agent is not known. An agent may be in a call work state such that the agent is processing a call but is not currently talking. The database in ARMS 44 also maintain information about whether the agent is logged in, logged out, and whether the agent is on a break or not. A table that holds break codes representing different types of breaks is maintained in ARMS 44, and information regarding the type of break an agent takes is also maintained within ARMS.

Figure 8A:
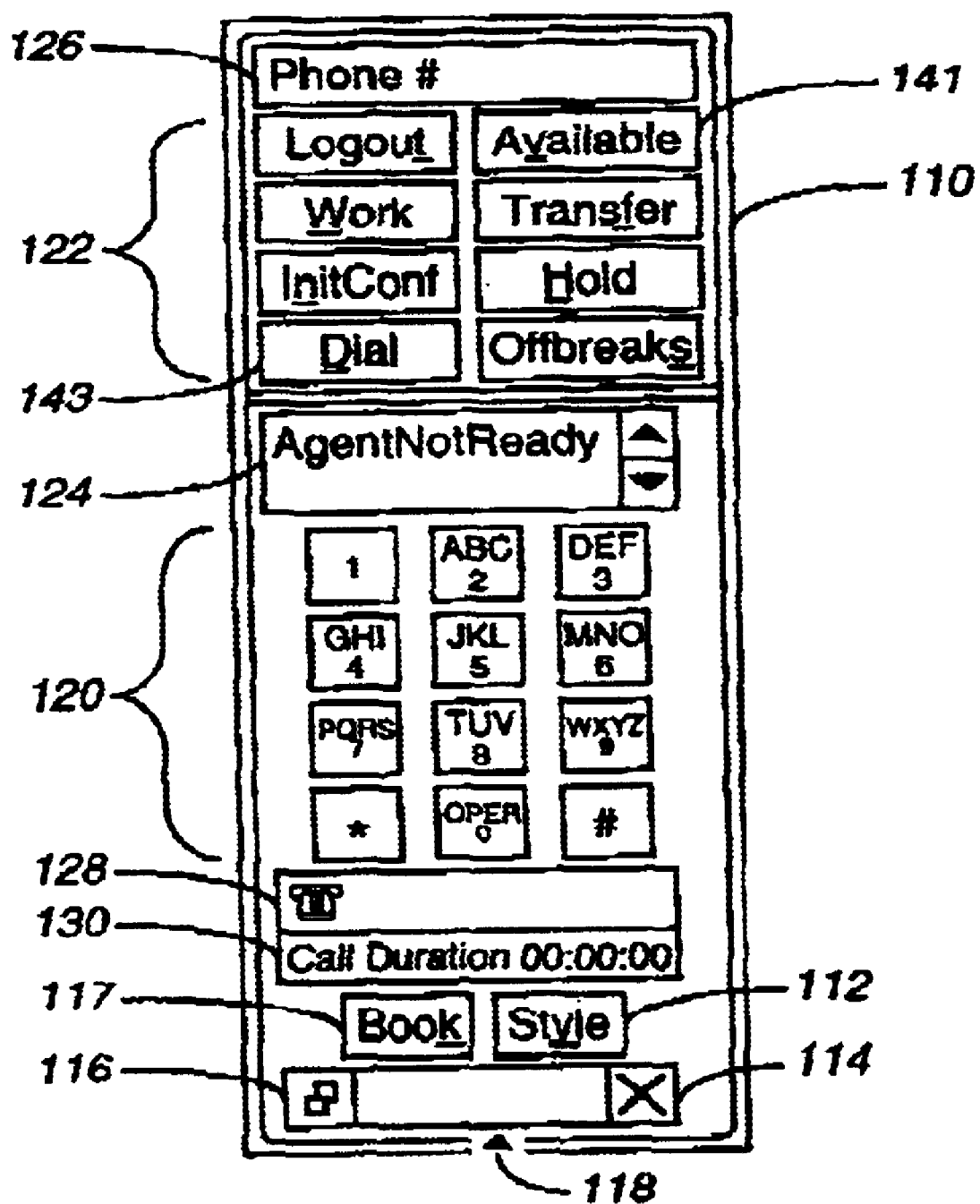
Figure 8B:
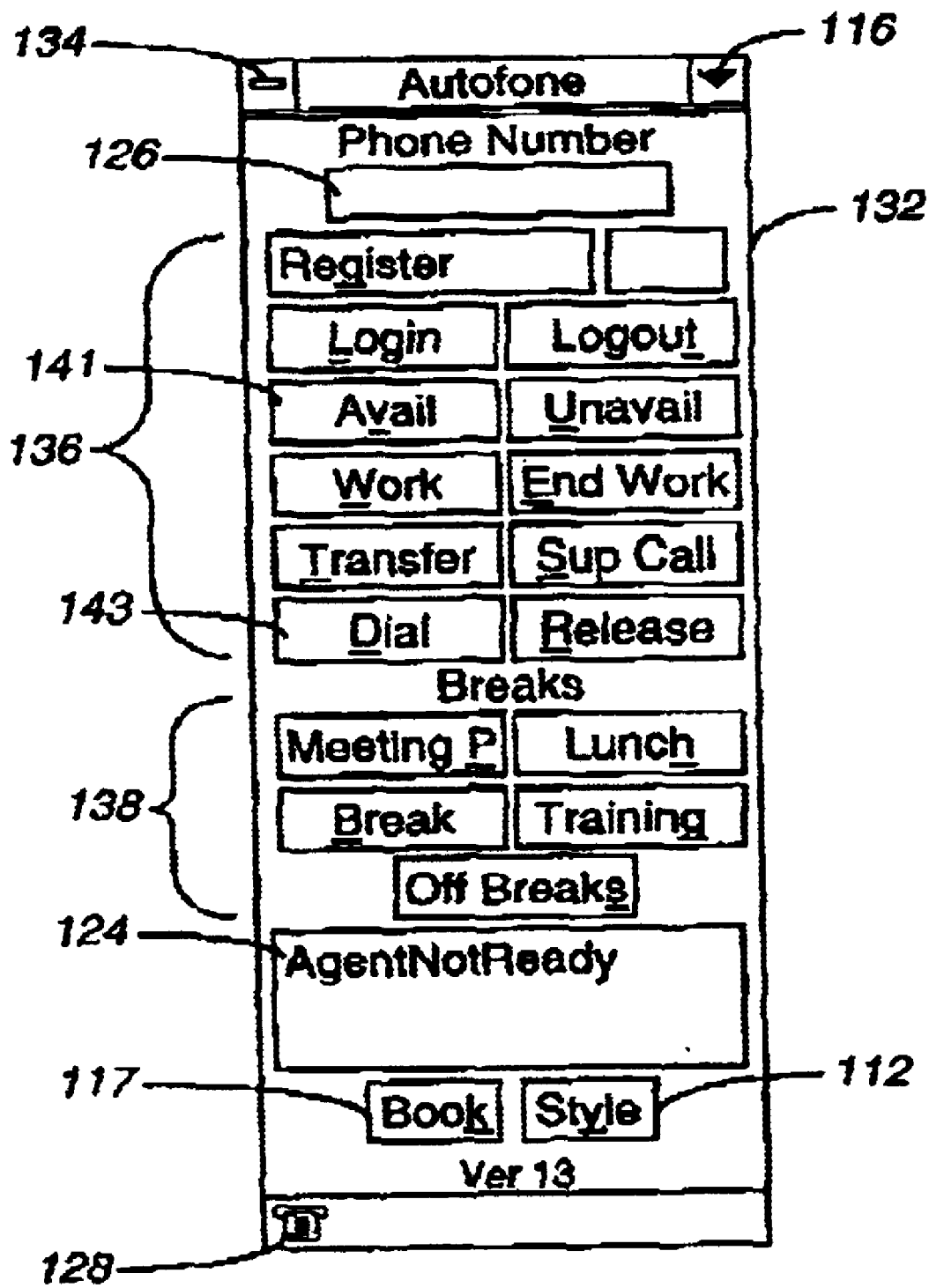

FIGS. 8A and 8B depict how the autofone window will appear after the autofone window is initially opened. The autofone window may appear in one of two styles: new or old. FIG. 8A depicts the new style window 110 and FIG. 8B depicts the old style window 132. Each of these autofone windows 110 and 132 includes a style button 112, which may be activated to toggle between the two styles. Thus, an agent may toggle from the new style to the old style or from the old style to the new style by activating the style button 112. The style button 112, like other buttons in the autofone windows 110 and 132, may be activated by positioning a mouse cursor to point at the button and clicking a mouse button.

The new style window 110 includes a close button 114 for closing the window and a resizing button 116 for resizing the window. The new window 110 also includes a book button 117 for requesting the display of the phone books that are provided as part of autofone 62. These phone books will be discussed in more detail below.

Figure 9:
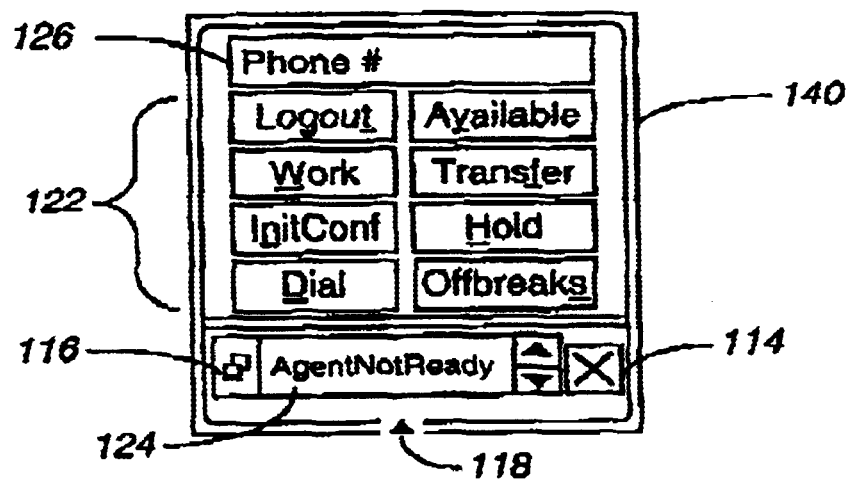
FIG. 9 depicts the format of a new style autofone window in the truncated state.

The new style autofone window 110 includes a clasp button 118 that may be activated to include or exclude the bottom portion of the window 110. FIG. 9 shows the appearance of a truncated version of the new style autofone window 140 after the clasp button 118 has been activated. As can be seen, the bottom portion of the new style autofone window 110, that includes the keypad 120 and elements below it, is not depicted in FIG. 9. The agent may return to the fully displayed new style autofone window 110 (as shown in FIG. 8) by activating the clasp button 118 when the truncated new style autofone window 140 (FIG. 9) is currently displayed.

The new style autofone window 110 includes a numerical keypad 120 for entering digits like a conventional telephone keypad. The new style autofone window 110 additionally includes a number of functional keys 122 that may be activated to update state information, manipulate phone calls, and the like. For example, the "Init Conf" key may be pressed to initiate a conference call, the "Transfer" button may be pressed to transfer a call, and the "Hold" button may be pressed to place a party on hold. A status window 124 holds status information regarding the agent. Initially, the status window 124 indicates the agent is not ready to receive calls ("AgentNotReady"). A phone number display 126 is also included as part of the window 110. Display 128 displays the number of incoming calls. Display 130 holds information regarding the duration of calls.

The old style autofone window 132 includes many of the same components as the new style autofone window 110. The old style autofone window includes a resizing button 116, a style button 112, a book button 118, a display 128 for holding the number of incoming calls, a display 126 for displaying phone calls, and an agent status display 124. The old style autofone window 132, however, holds a system menu button 134 that may be activated to display a system menu, such as commonly found with windows in the Microsoft® Windows®, version 3.1, operating system. The old style autofone window 132 is also different from the new style window 110 with respect to the functional buttons 136 that it contains. There is an overlap between the buttons contained in the two styles of windows, but the buttons are also differently arranged and the old style autofone window 132 includes additional buttons. The old style autofone window 132 also differs in that it has multiple break buttons 138. These break buttons 138 may be activated to identify not only that the agent is on break but what kind of break the agent is currently on.

Figure 10A:
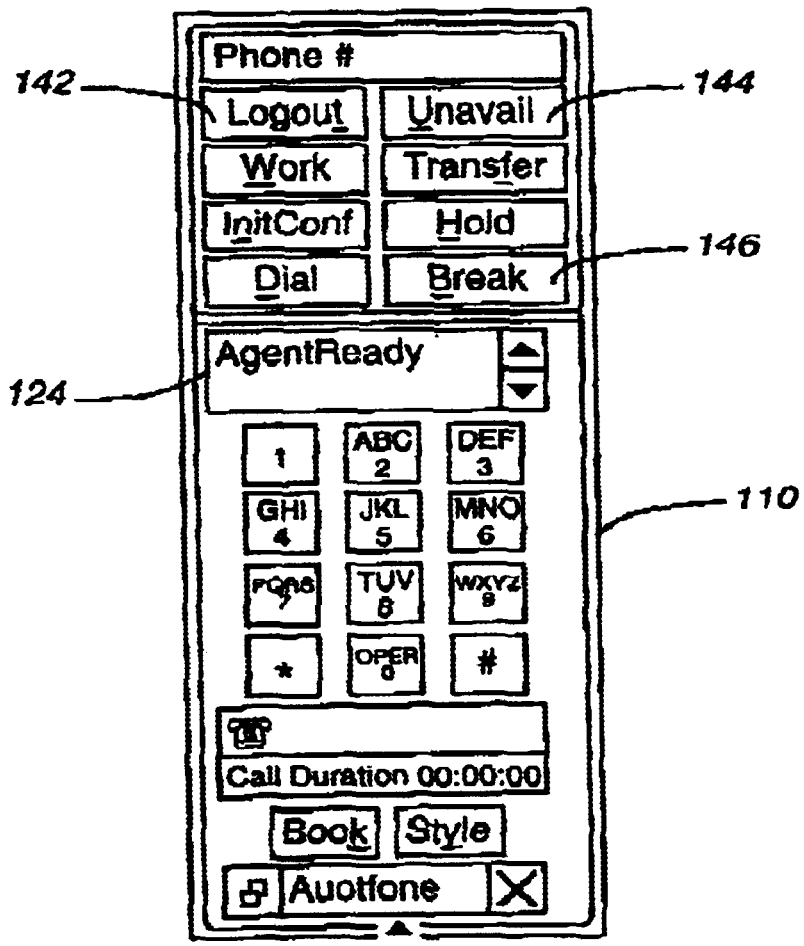
FIG. 10A indicates the appearance of a new style autofone window when the agent is available to receive calls.
Figure 10B:
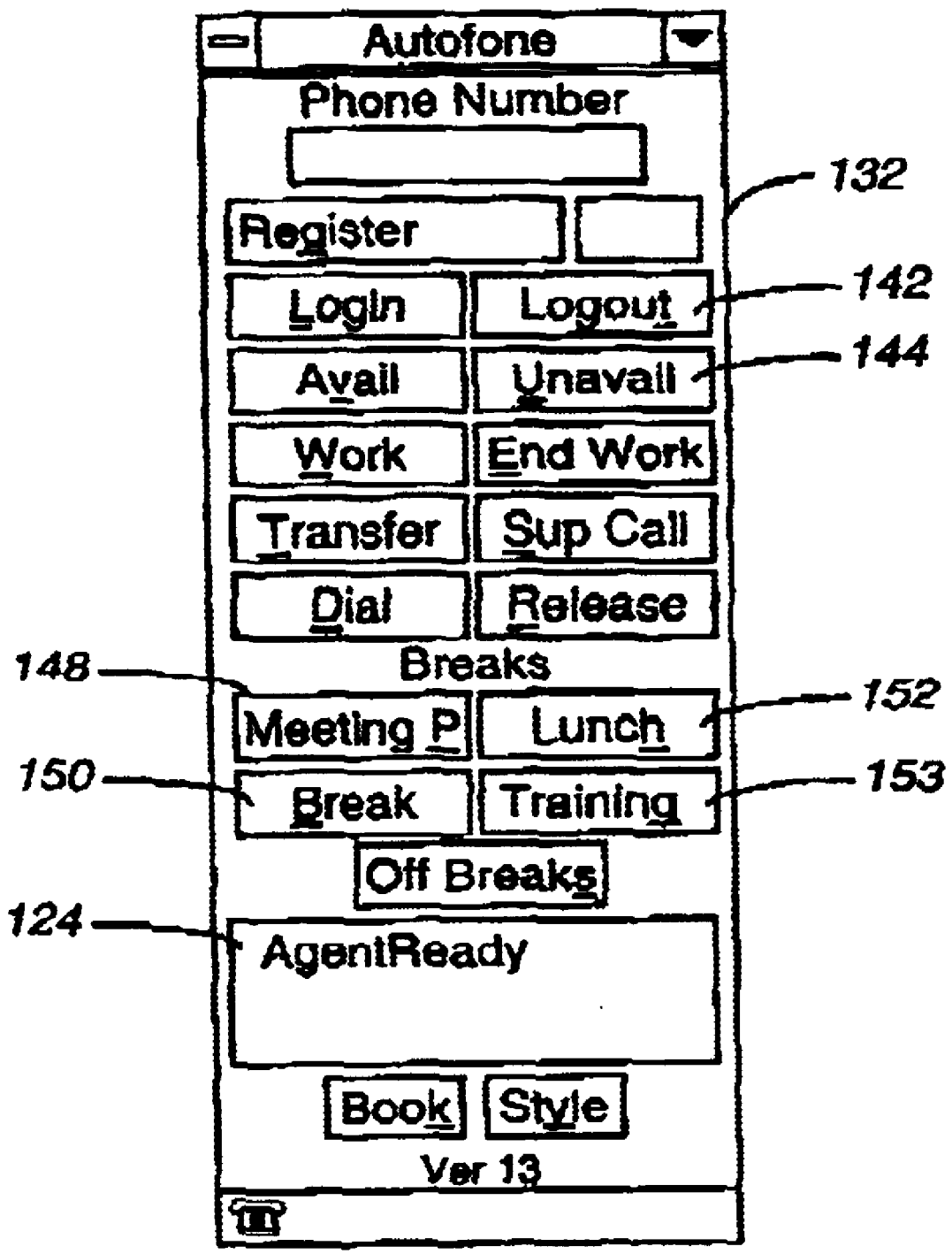
FIG. 10B indicates the appearance of an old style autofone window when the agent is available to receive calls.

After an agent is logged on, the agent may use the autofone windows 110 and 132 to indicate that the agent is now ready to receive calls. The agent indicates that the agent is available to receive calls by pressing the available button 141 (FIGS. 8A and 8B). This causes the state information stored in ARMS 44 to be updated to indicate that the agent is in the available state. FIGS. 10A and 10B depict the appearance of the new style autofone window 110 and the old style autofone window 132 in such an instance. The message ("AgentReady") displayed within the status display 124 indicates that the agent is ready to receive calls. In addition, the functional buttons that are available to the agent have changed. The available button 144 has changed to an unavailable button 144 that may be used by the agent to toggle to the unavailable state. Furthermore, the logout button 142 has become grayed out so as to no longer be immediately available to the agent. In the new style autofone window 110, the break button 146 has become activated. In the old style autofone window 132, the meeting break button 148, the generic break button 150, and the lunch break button 152 have become active.

Figure 11A:
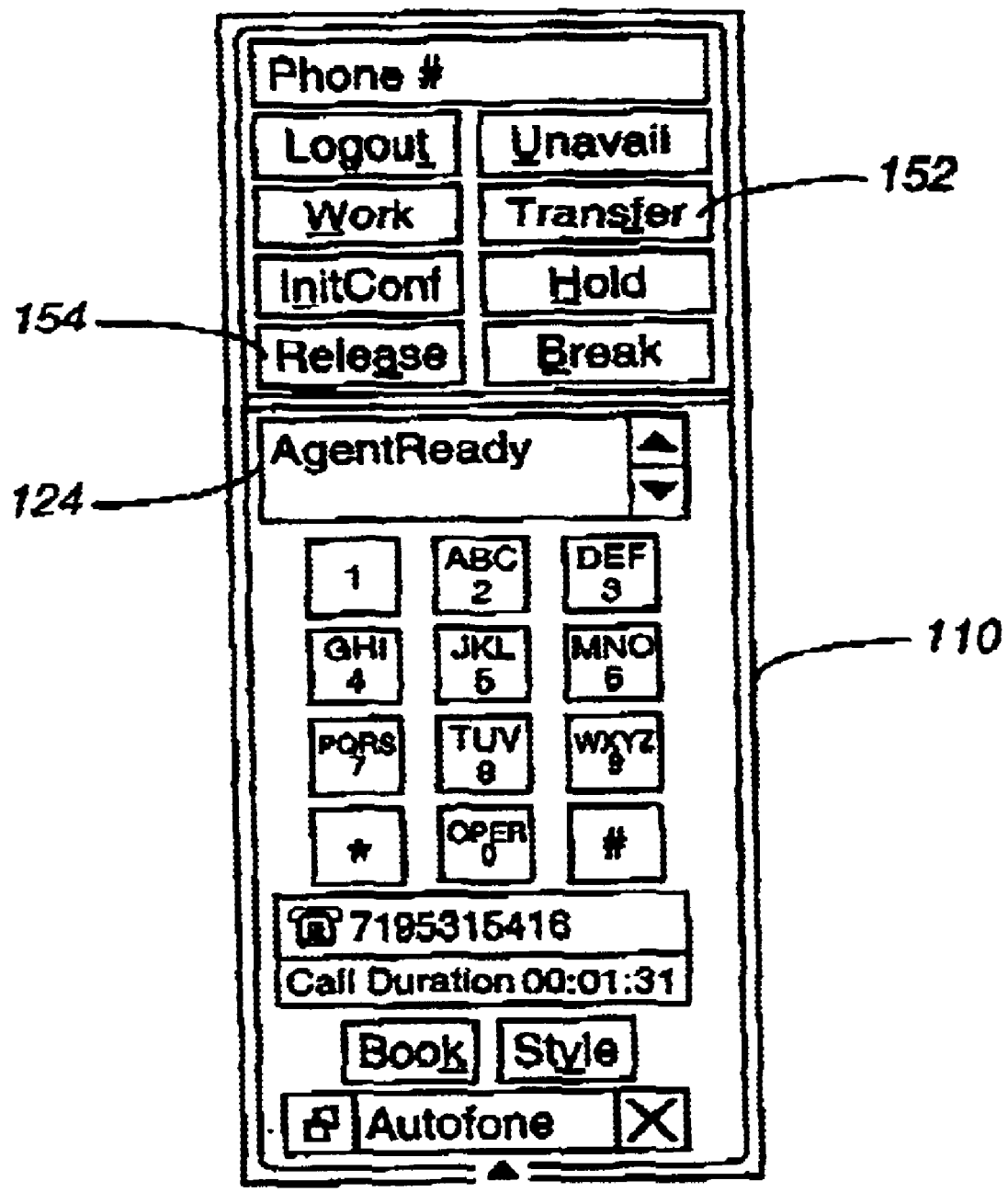
FIG. 11A depicts the format of a new style autofone window after an agent has received a call.
Figure 11B:
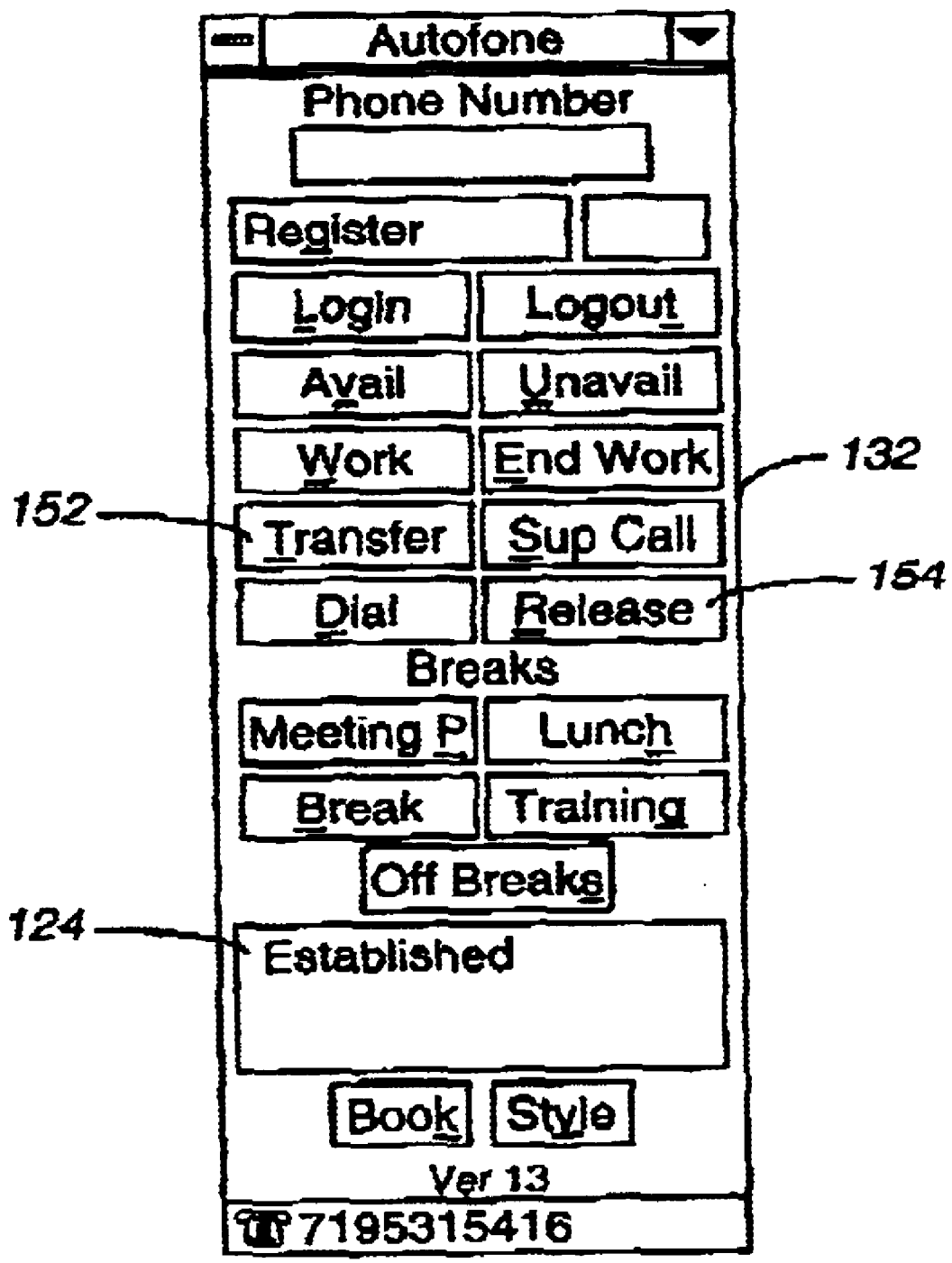
FIG. 11B depicts the format of an old style autofone window after an agent has received a call.

The appearance of the new style autofone window 110 and the old style autofone window 132 also changes when the agent receives a call (i.e., a call with the agent is established). As is shown in FIGS. 11A and 11B, the status display 124 indicates that a call has been established. In addition, the transfer button 152 becomes active to enable the user to transfer the call. Furthermore, the release button 154 becomes active to enable the agent to release the call.

Figure 12:
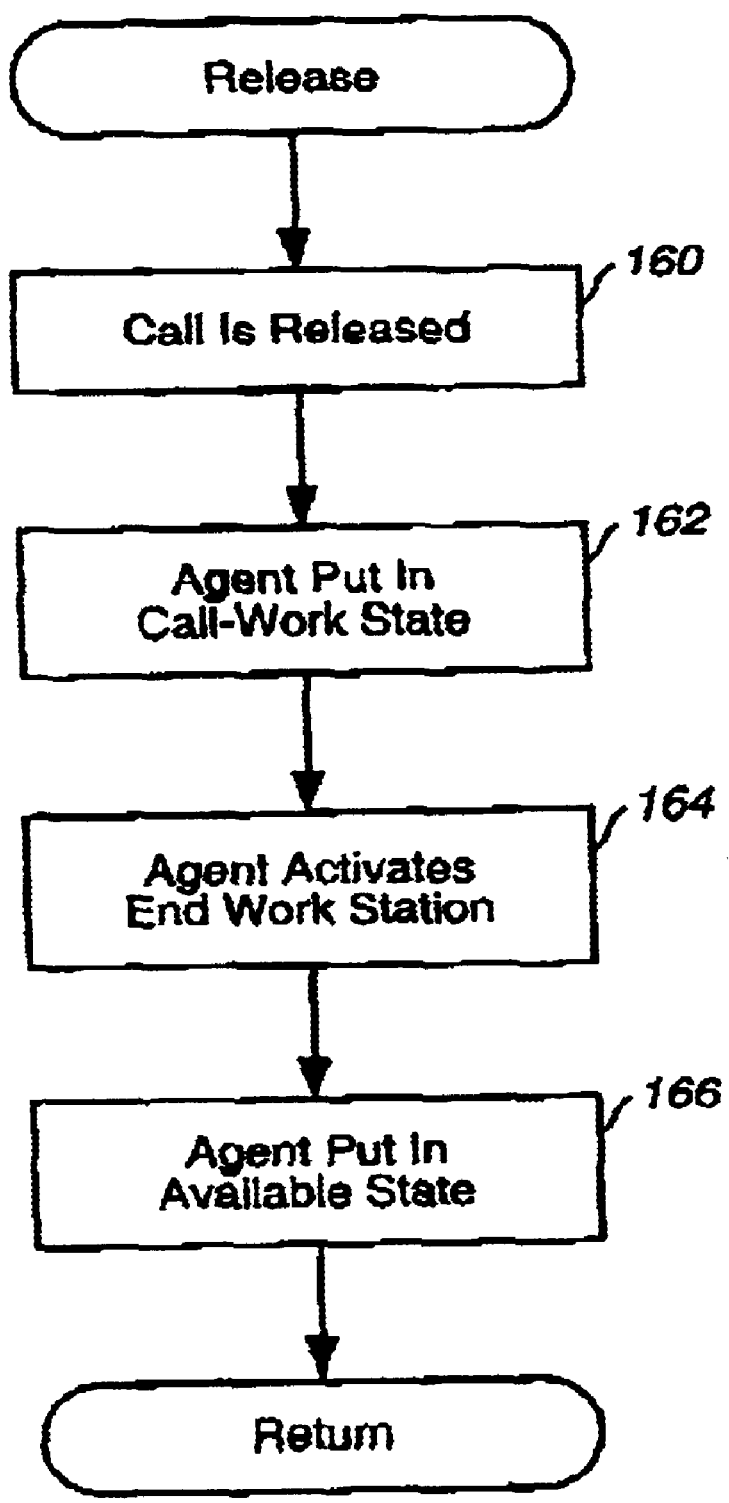
FIG. 12 is a flow chart illustrating the steps that are performed to release a phone call in a preferred embodiment of the present invention.
Figure 13A:
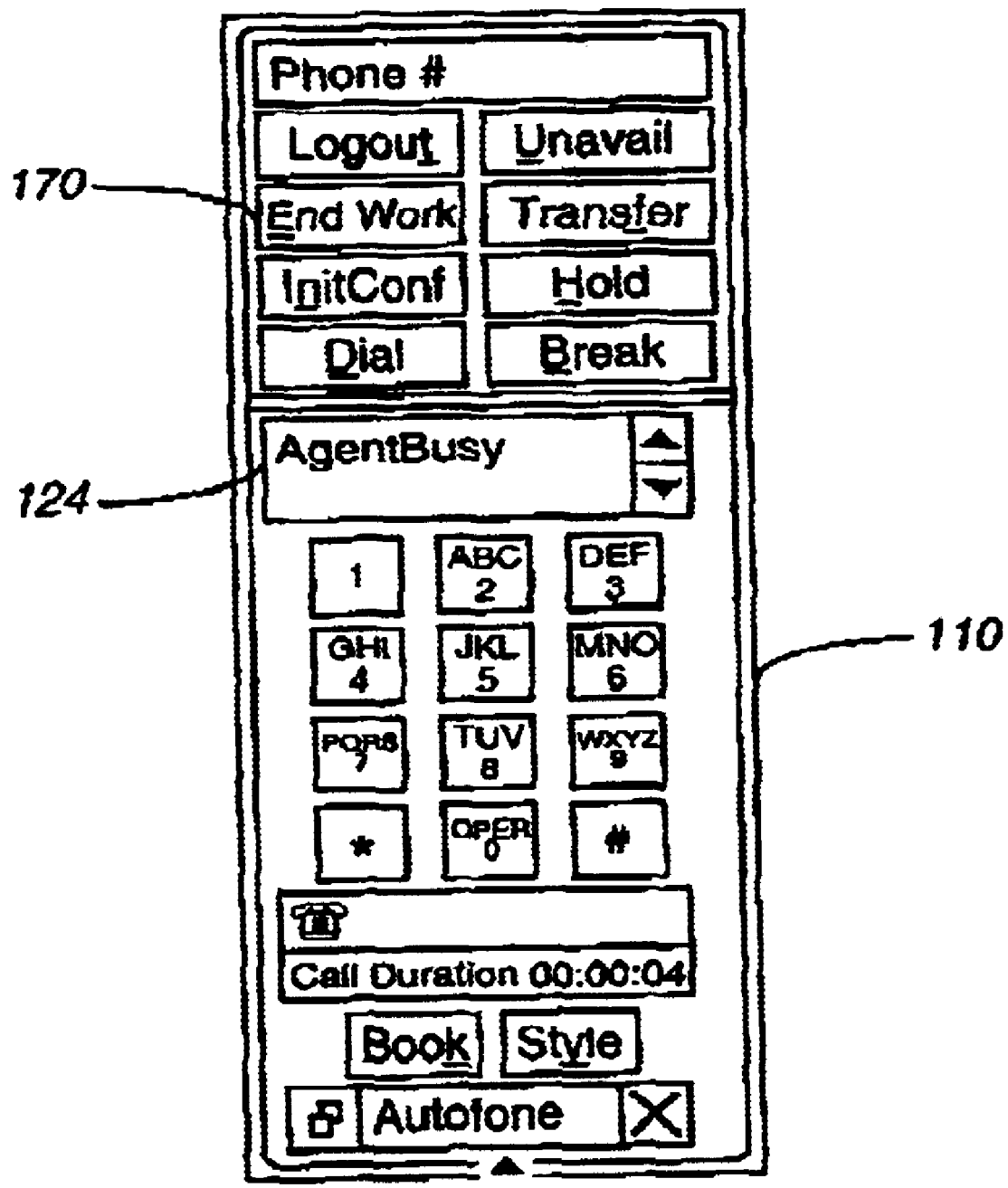
FIG. 13A depicts a new style autofone window after an agent has released a call.
Figure 13B:
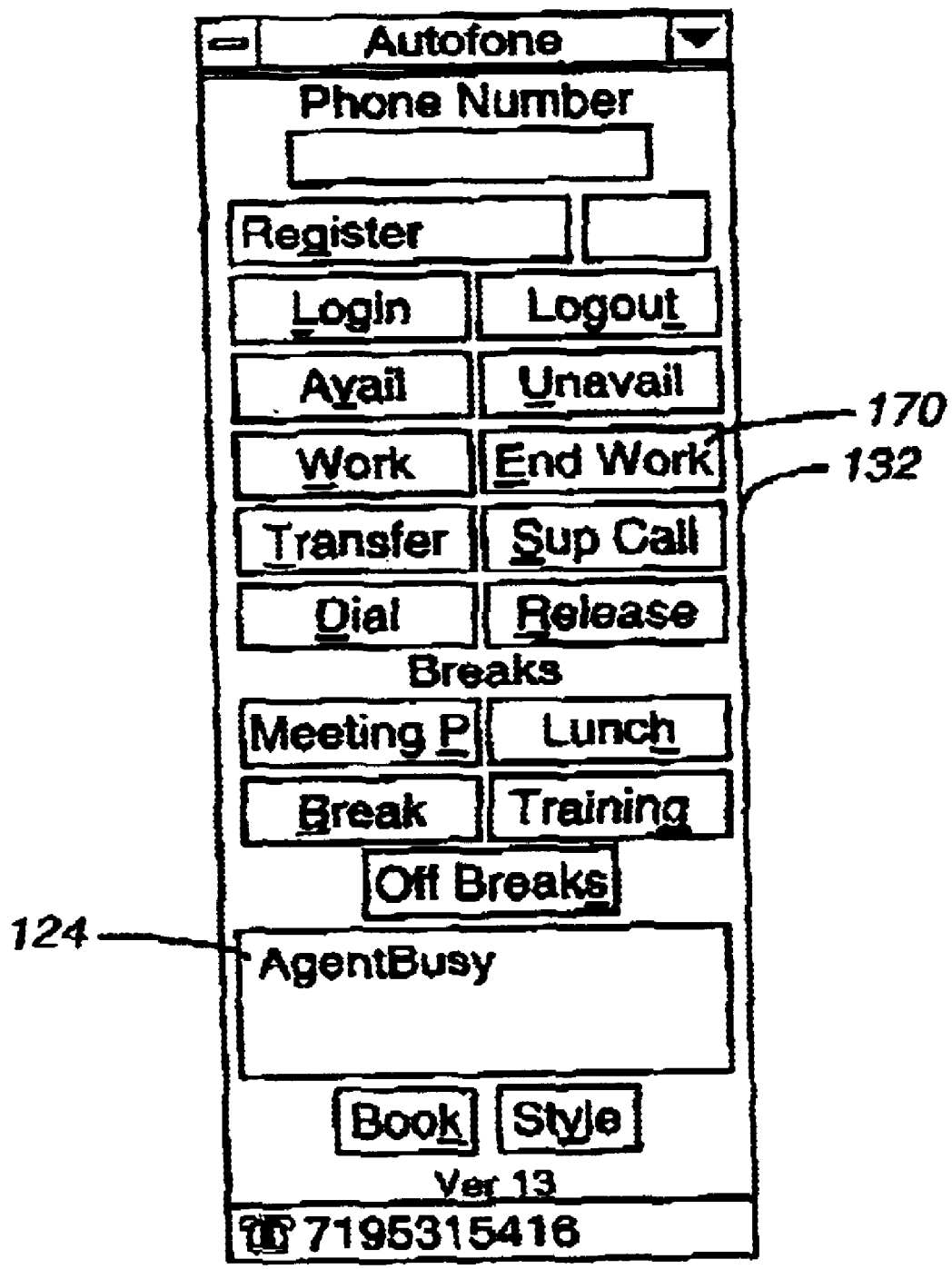
FIG. 13B depicts an old style autofone window after an agent has released a call.

FIG. 12 is a flow chart illustrating the steps that are performed when a call is released by an agent using autofone 62. An agent may release the call by pressing the release button 154 or, alternatively, by the calling party hanging up (step 160 in FIG. 12). In response, the agent is put into the call work state (step 162 in FIG. 12). FIGS. 13A and 13B depict the appearance of the new style window 110 and the old style window 132 in such an instance. The status display 124 indicates that the agent is busy ("AgentBusy") and the end work button 170 becomes active. The agent may exit the call work state by activating the end work button 170 (step 164 in FIG. 12). Activation of this button 170 places the agent in the available state (step 166 in FIG. 12).

Figure 14:
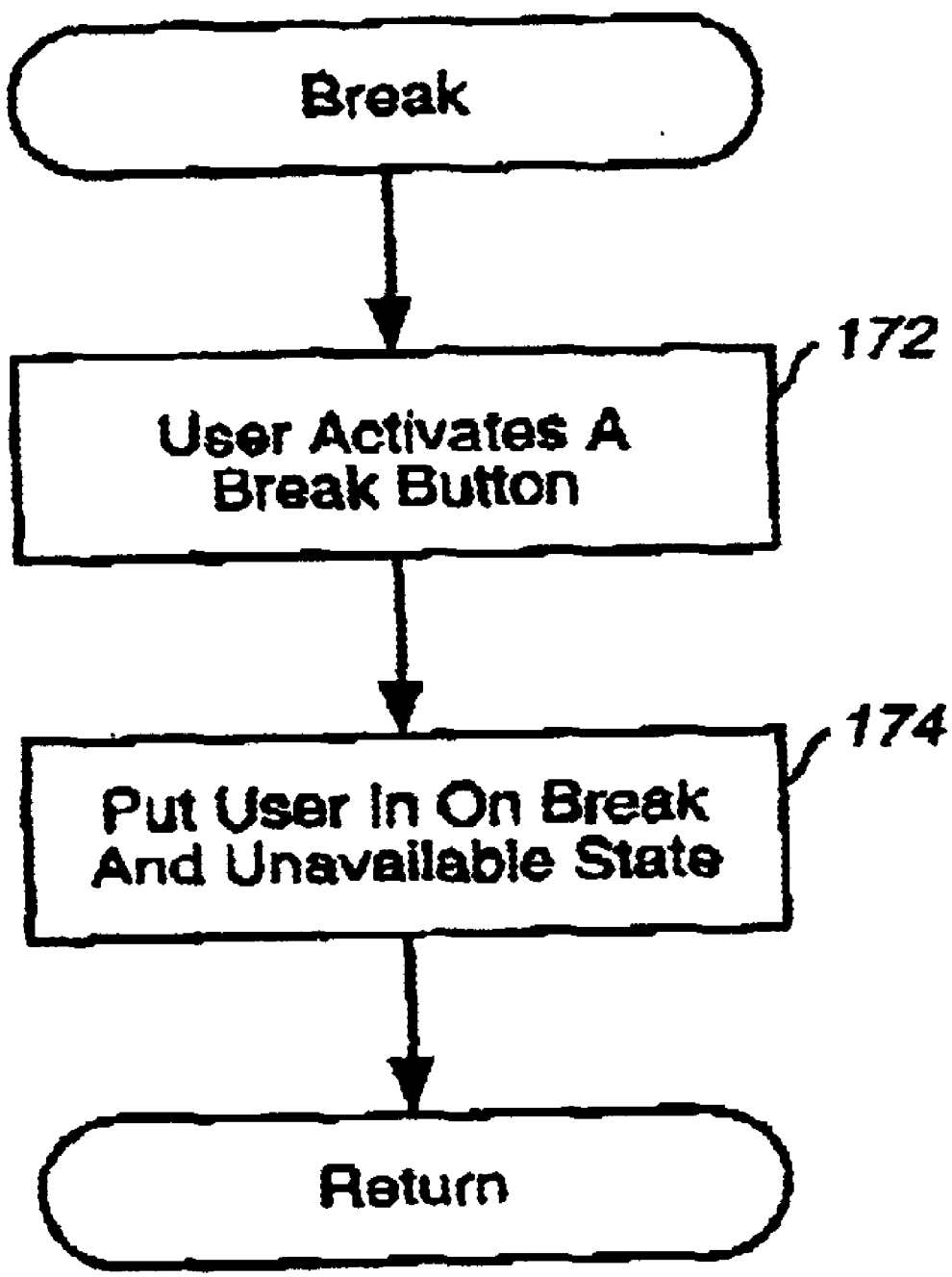
FIG. 14 illustrates the steps that are performed when an agent decides to take a break.

As was mentioned above, the agent may depress a break button to indicate that the agent is going on break. In the new style autofone window 110, the agent depresses the break button 146 to indicate that the agent is going on break and in the old style autofone window 133, the agent depresses one of the break buttons 138 (see FIG. 8B) to indicate that the agent is on break (step 172 in FIG. 14). With the old style autofone window 132, the agent may press the meeting break button 148, the generic break button 150, the lunch break button 152, or the training break button 153. As a result of the agent activating one of the break buttons, the agent is placed on break and is put in an unavailable state (step 174 in FIG. 14). In particular, the tables held within ARMS 44 are updated to indicate that the agent is on break and that the agent is in the unavailable state. When the old style autofone window 132 is used, the type of break being taken by the agent is also noted, and the break type information is updated within ARMS 44. This information may be used by the monitoring client application program that is run on the supervisor/control workstations 38. The integration of autofone 62 with ARMS 44 in CTIMS 36 provides an added level of functionality that would not otherwise be available.

Figure 15:
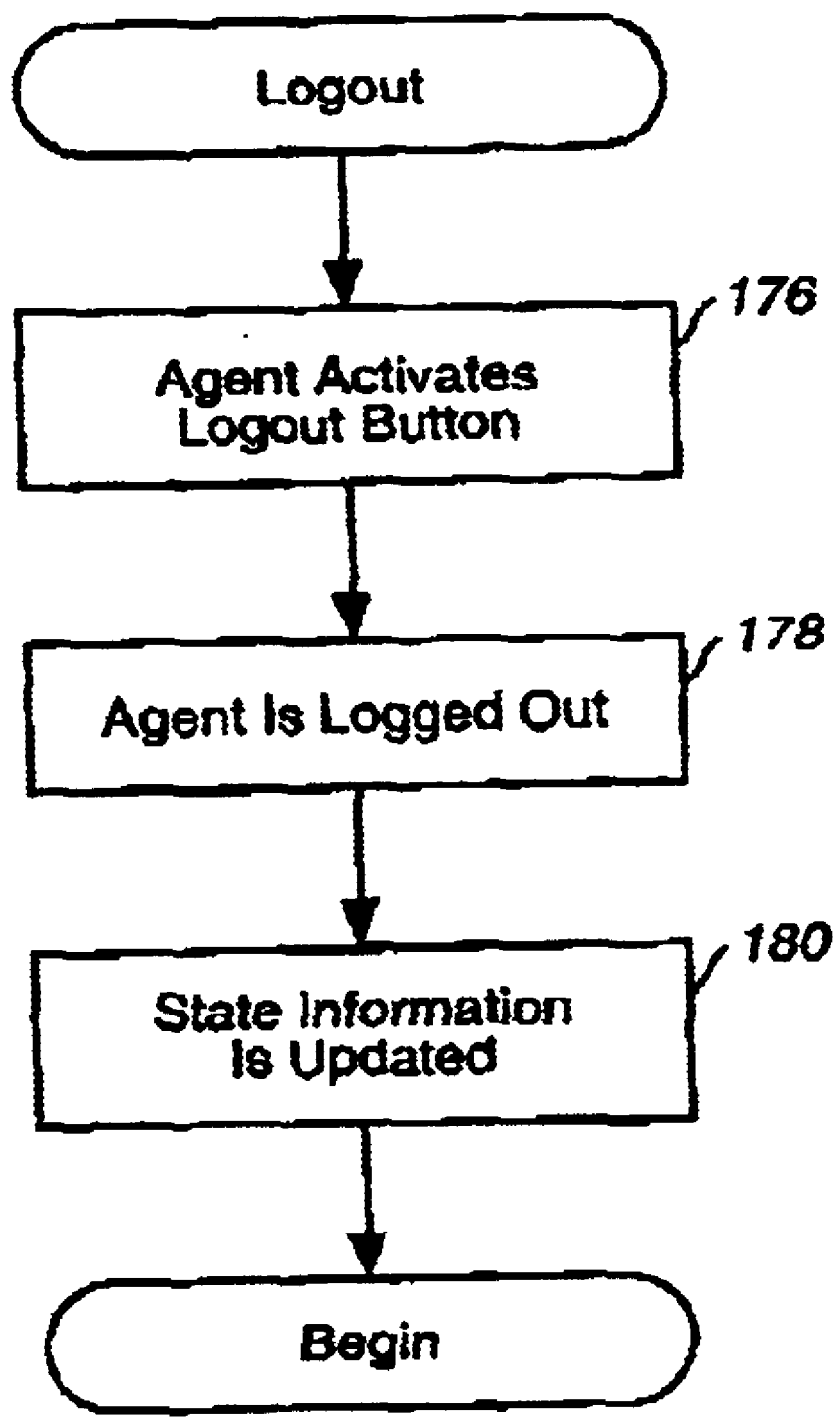
FIG. 15 illustrates the steps that are performed when an agent decides to log out.
Figure 16A:
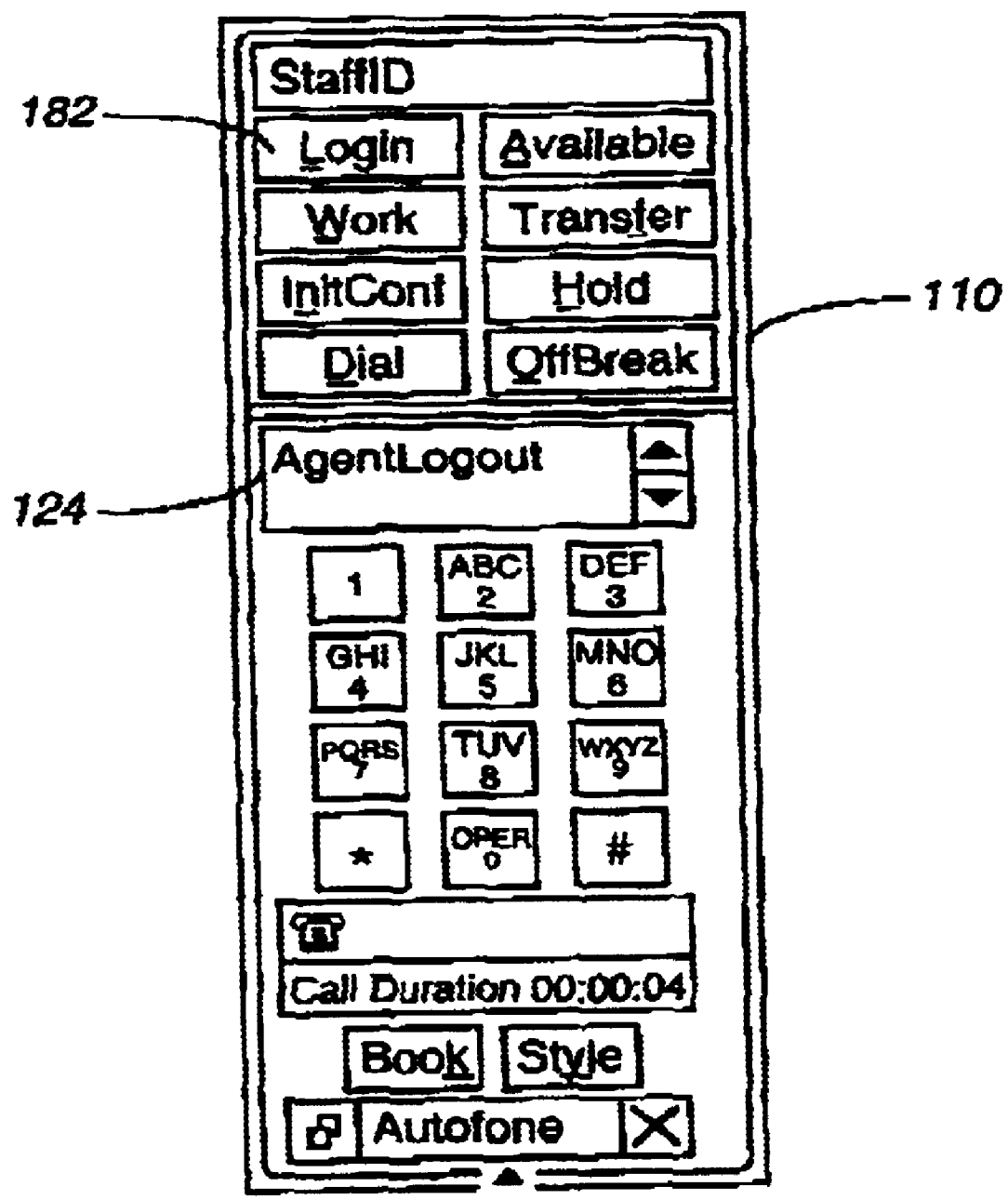
FIG. 16A illustrates a new style autofone window after an agent has logged out.
Figure 16B:
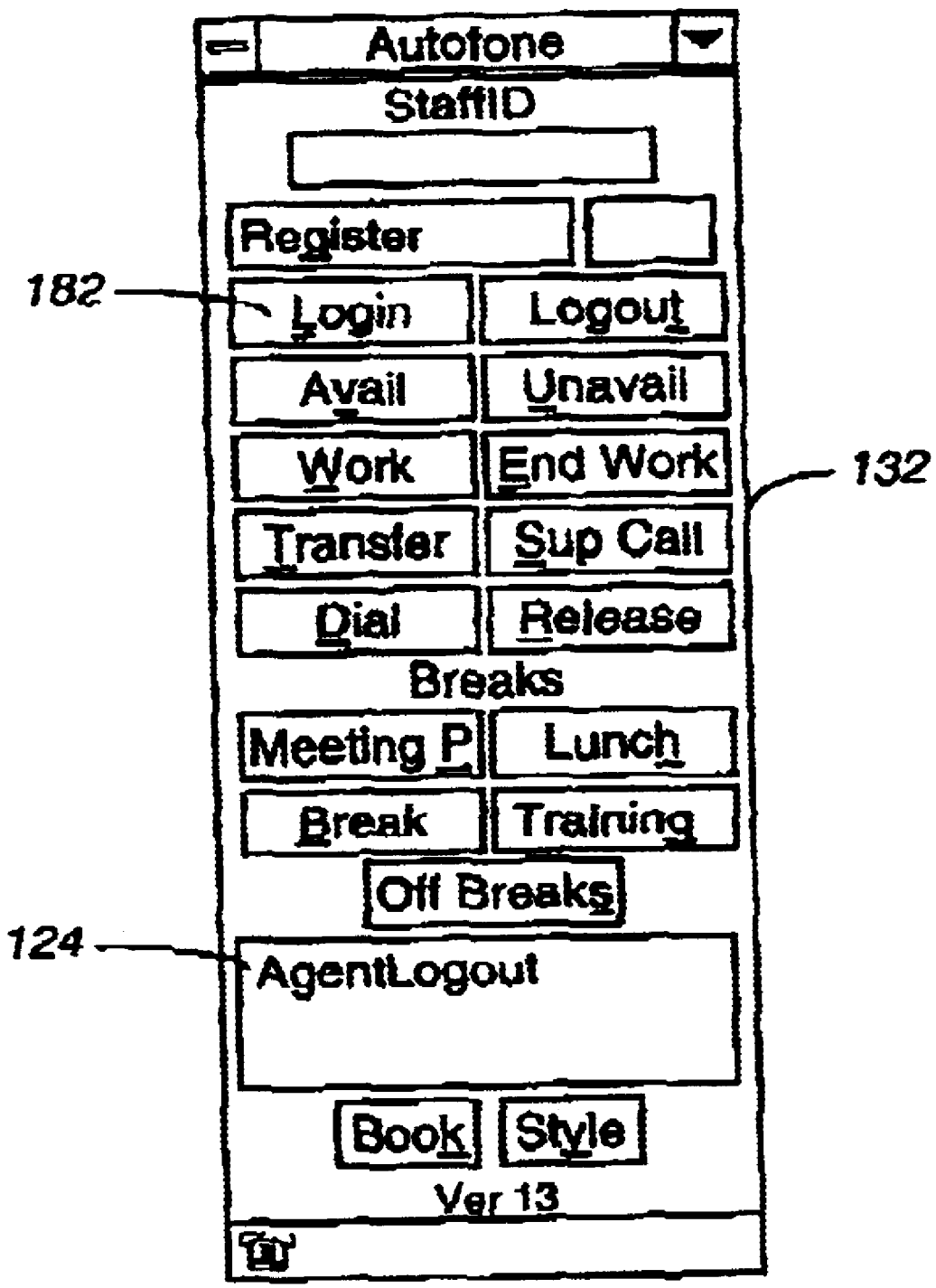
FIG. 16B illustrates an old style autofone window after an agent has logged out.

At the end of a agent's work shift or when the agent is ready to go to lunch or take a coffee break, the agent may wish to log out. The agent logs out by pressing the logout button 142 (step 176 in FIG. 15). This causes the agent to enter the logged out state (step 178 in FIG. 15). State information regarding how long the agent was logged in and when the agent logged out is updated in ARMS 44 (step 180 in FIG. 15). FIGS. 16A and 16B depict the state of the new style autofone window 110 and the old style autofone window 132, respectively, when the agent logs out. Specifically, the status display 124 indicates that the agent is logged out ("AgentLogout"), and the login button 182 becomes active.

Figure 25:
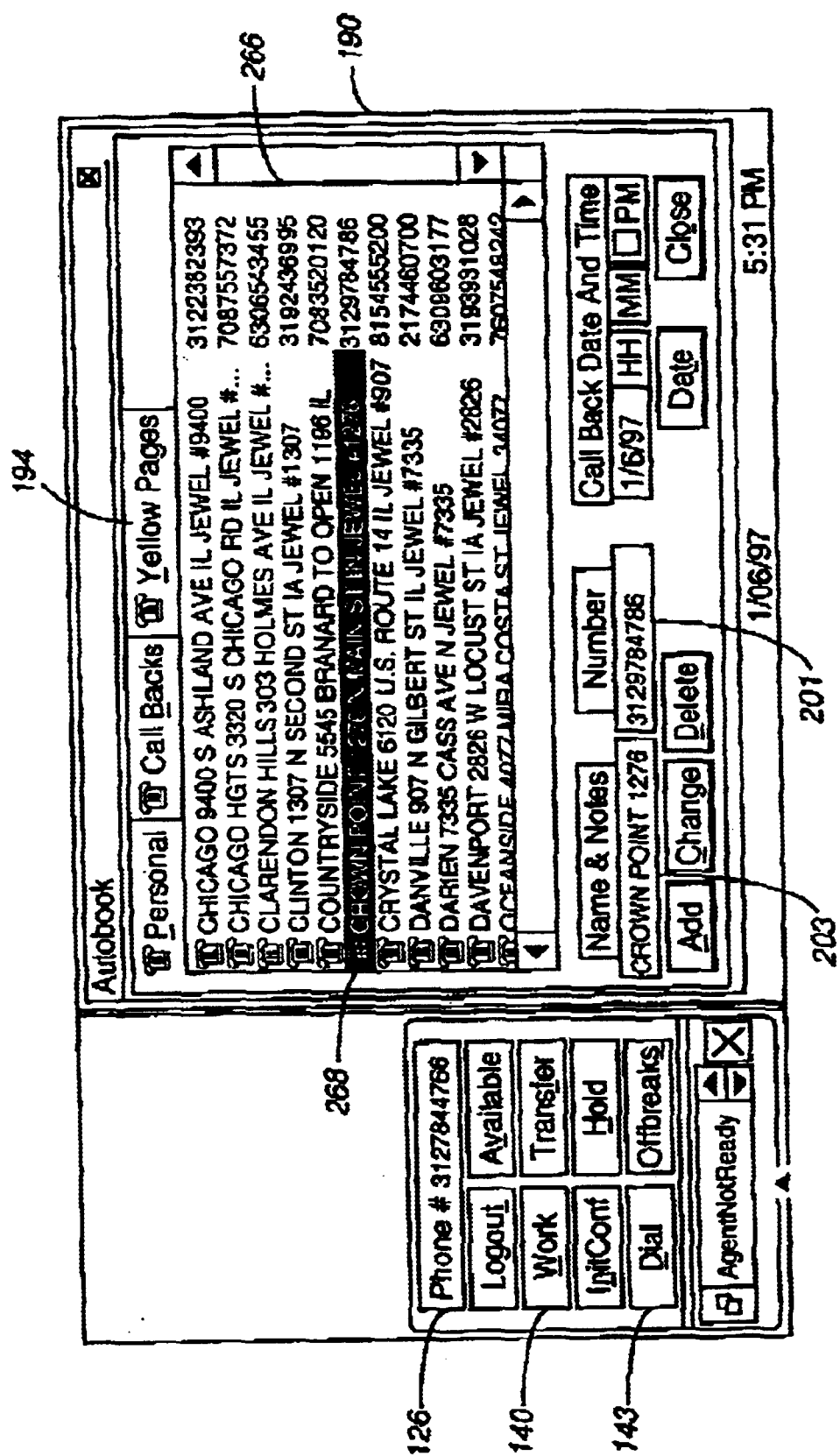
FIG. 25 illustrates the format of a yellow pages phone book.

As has been discussed above, autofone 62 provides a user with multiple phone books. The agent may cause a phone book to be displayed by activating the book button 117. In response, the phone book is displayed (step 184 in FIG. 17). FIG. 18 depicts an example of a phone book window 190 that may be displayed in response to activating the book button. The phone books window 190 includes a tab 192 for the Personal phone book, a tab 194 for the Call Backs phone book, and a tab 196 for the Yellow Pages phone book. In the example depicted in FIG. 18, the Personal phone book 192 is selected but is empty. The phone books window 190 also includes a Call Back section 198 that holds the date and time for any call back. This section 198 includes a date field 200, an hour field 202, a minute field 204, and an AM/PM checkbox 206. The phone books window 190 also includes a Number field 201 and a Name & Notes field 203. The Call Back section 198, the Number field 201, and the Name & Notes field 203 will be described in more detail below. A user selects the phone book of interest by selecting the appropriate tab 192, 194, or 196. FIG. 25 depicts an example of the Yellow Pages phone book, which will be described in more detail below.

Figure 17:
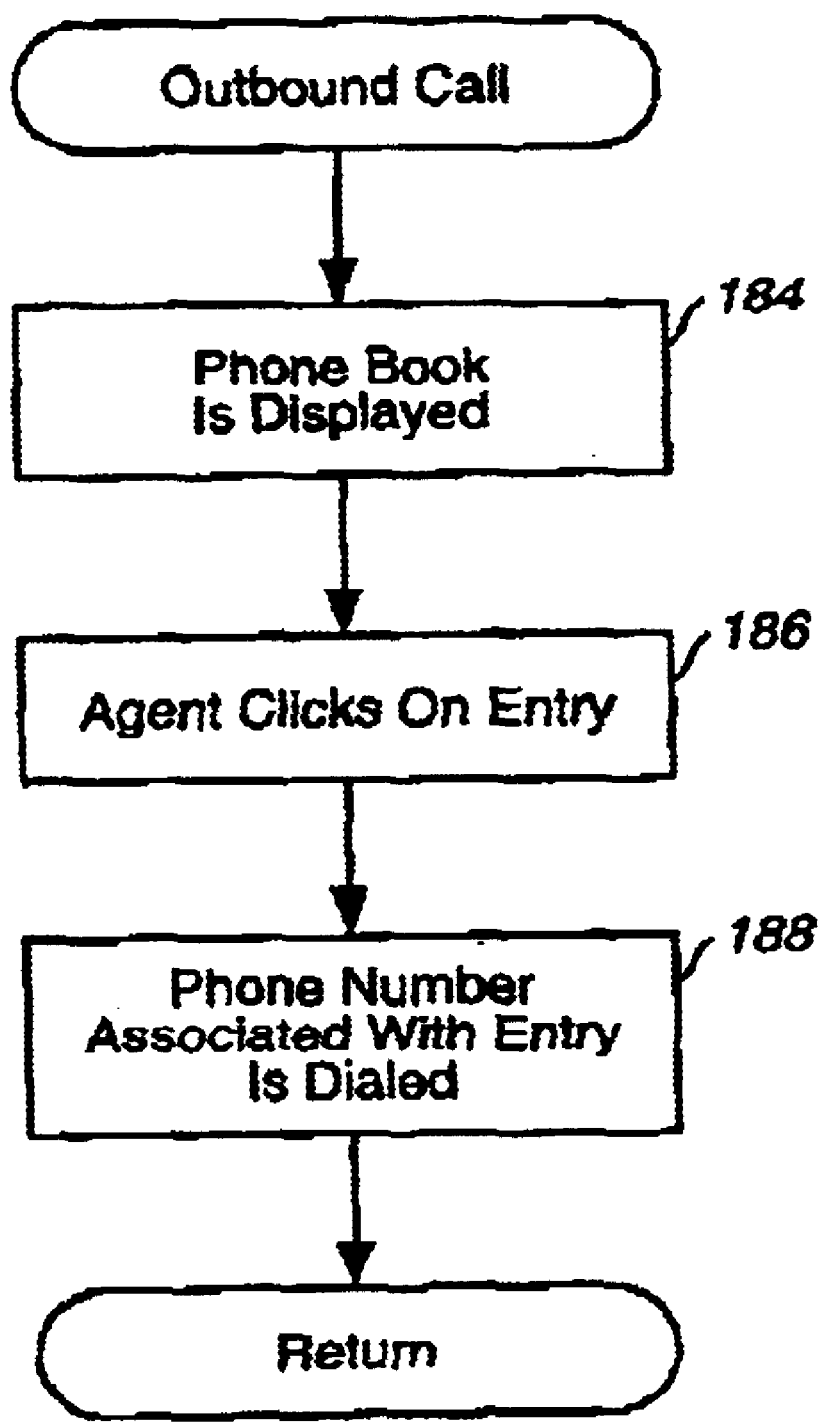
FIG. 17 is a flow chart illustrating how an outbound call may be initiated by clicking on a phone book entry.
Figure 18:
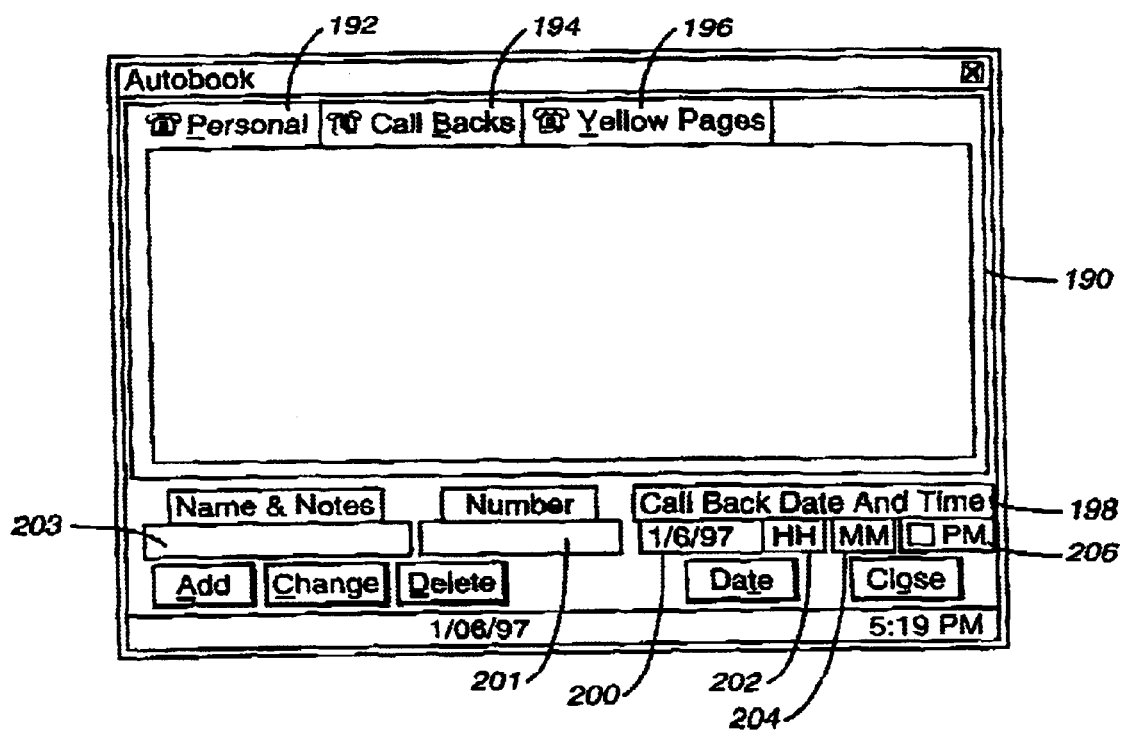
FIG. 18 depicts a phone book window.

A user may place an outbound call using a phone book by clicking on an entry within the phone book (step 186 in FIG. 17). The phone number associated with the entries is then automatically dialed (step 188 in FIG. 17). As will be described in more detail below, autofone 62 also facilitates other ways of placing outbound calls.

Figure 19A:
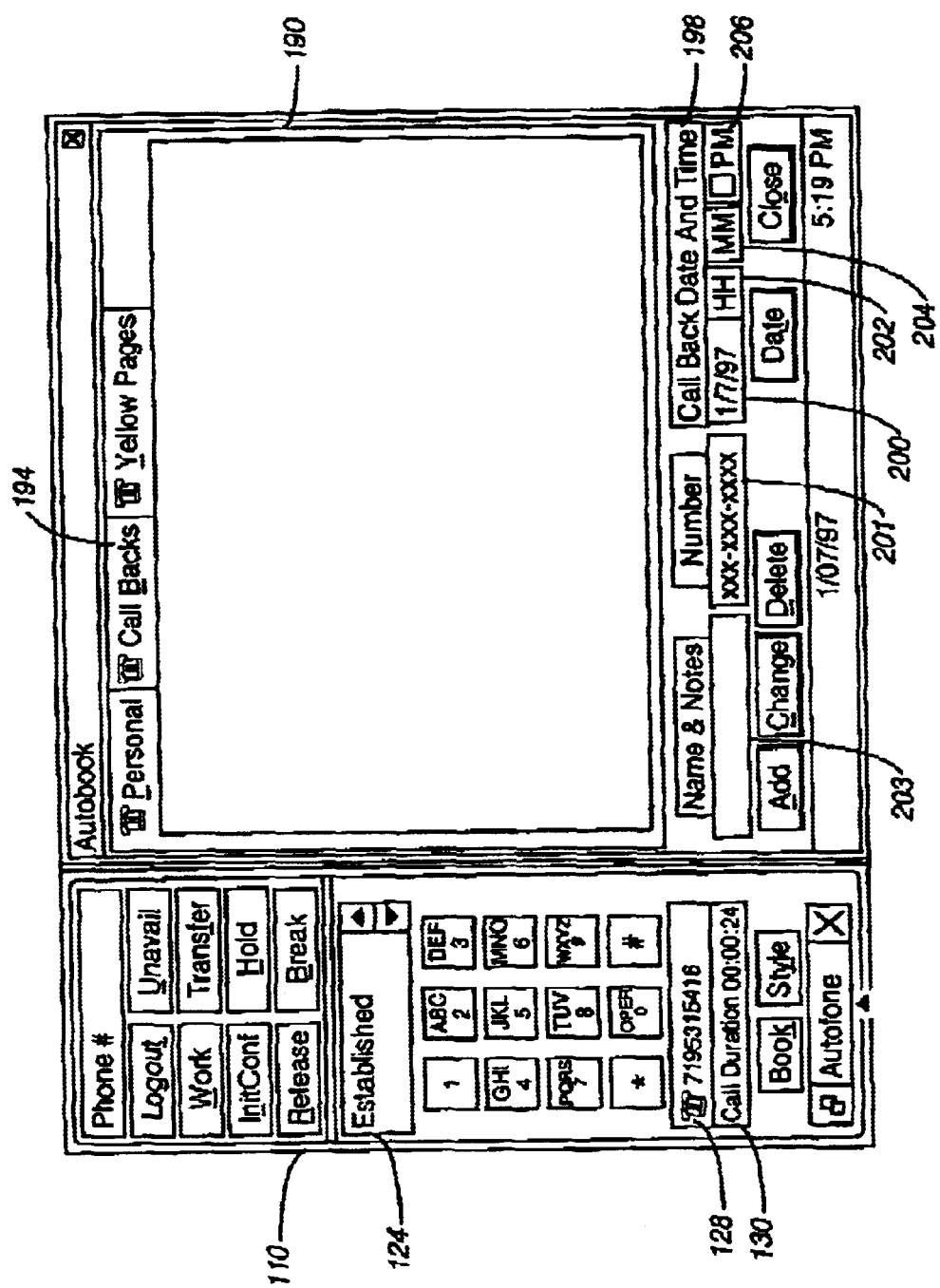
FIGS. 19A and 19B illustrate how a call back entry may be created in the Call Backs phone book via the user interface.
Figure 19B:
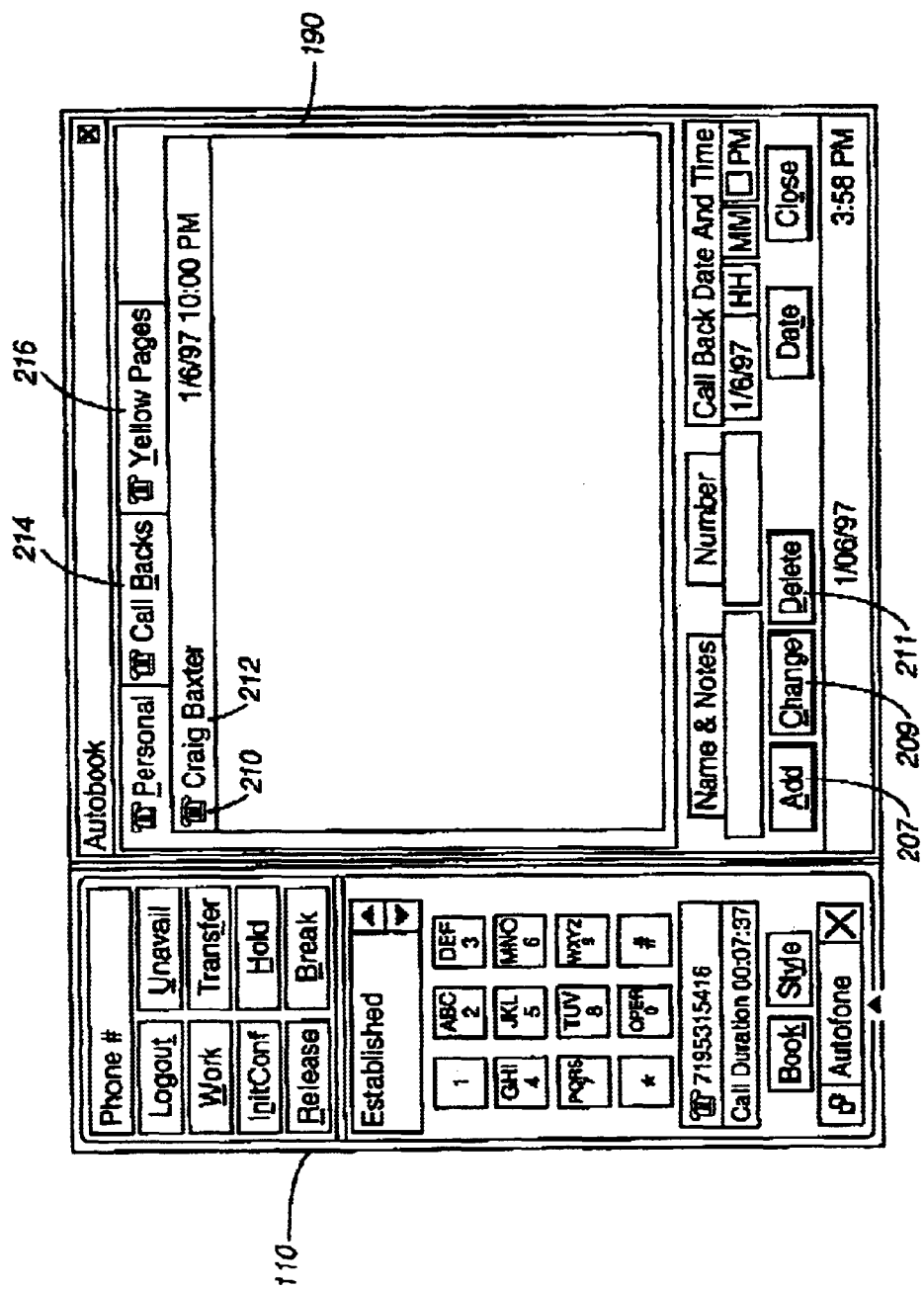

The phone books are editable such that new entries may be added and deleted from the phone books. As was mentioned above, the Call Backs phone book holds entries for phone numbers that the agent wishes to call back at a later time. FIGS. 19A and 19B illustrate how an entry may be added to the Call Backs phone book. FIG. 19A shows the new style autofone window 110 and the phone books window 190. In the example shown in FIG. 19A, a call is currently established with an agent. The status display 124 indicates that a phone call is established, and the call duration display 130 indicates that the call has been established for 24 seconds. The phone number of the call is shown within display 128. An entry may be added to the Call Backs phone book by selecting the Call Backs tab 194 and double clicking on the phone number displayed within display 128. This causes the phone number to be displayed within the Number field 201 in the phone books window 190. The name to be included in the entry is then added in the Name & Notes field 203. The Call Backs day and time may be then added in fields 200, 202, 204, and 206. After this is done, and the Add button 207 is activated, the entry 210 appears within the Call Backs phone book. The entry includes a name 212, a phone number 214, and a Call Back time and date information 216.

It should be appreciated that entries may be added to the Personal phone book or the Yellow Pages phone book in a similar fashion.

The change button 209 shown in FIG. 19B may be used to edit an entry in the phone book. A user needs to select the entry, press the change button 209, and then edit the information for the entry. In addition, an entry may be deleted using the delete button 211. The entry needs to be selected (such as by positioning a mouse cursor over the entry and clicking the mouse button). The delete button 211 is then activated to delete the entry.

Figure 20:
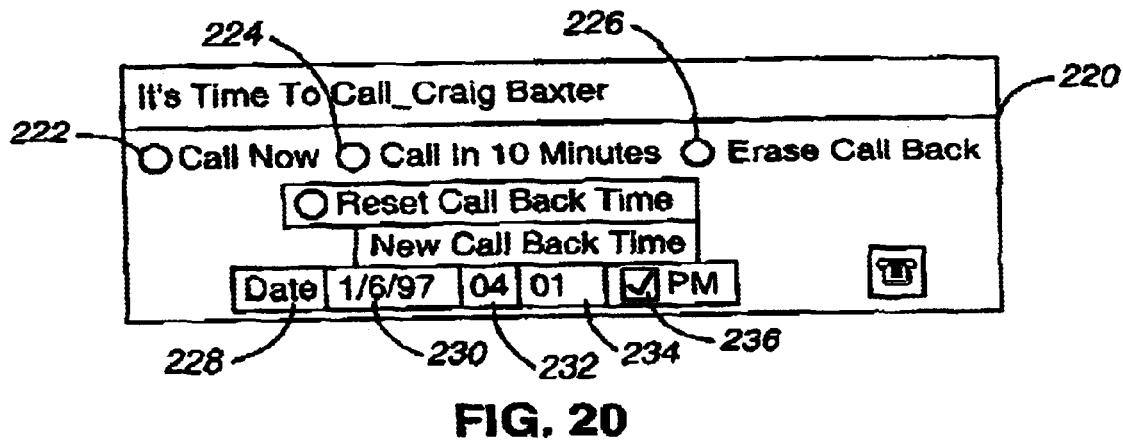
FIG. 20 depicts an example call back reminder window.
Figure 21:
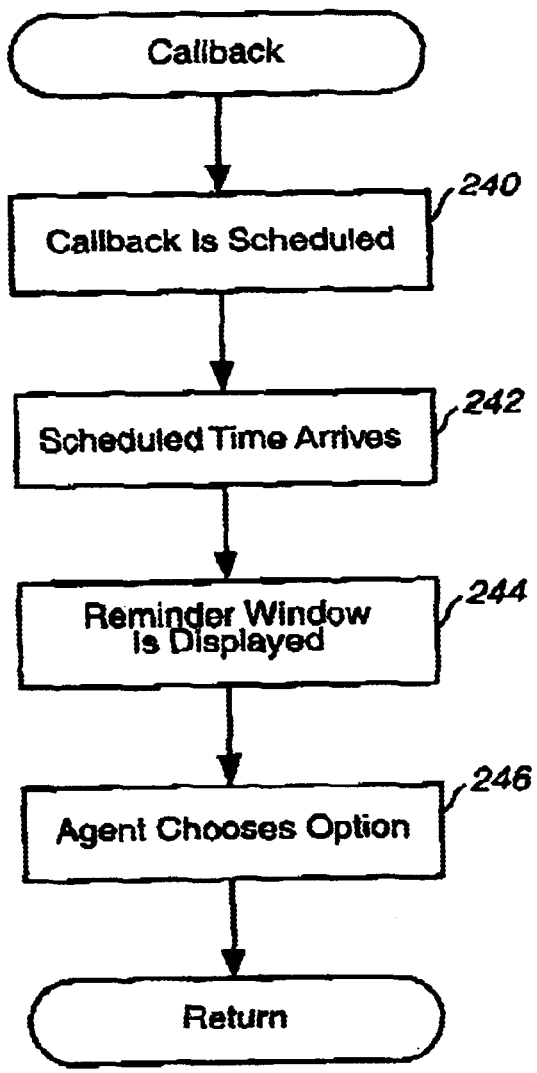
FIG. 21 depicts the steps that are performed for call backs in the preferred embodiment of the present invention.

FIGS. 20 and 21 illustrate the use of call backs. Initially, a call back is scheduled 240 by creating an entry within the Call Backs phone book. The scheduled time arrives (step 242 in FIG. 21). A reminder window is displayed when the scheduled time arrives (step 244 in FIG. 21). FIG. 20 depicts an example of a reminder window 220. The reminder window indicates the name of the party that is to be called. The reminder window includes options that the agent may select to determine whether to execute the call back and when to execute the call back. Option 222 may be selected to immediately call and execute the call back. Option 224 may be selected to perform the call back 10 minutes from the current time. Option 226 may be selected to remove the call back and option 228 may be chosen to change the call back time to an agent-determined time. When option 228 is chosen, the agent fills in a date field 230, an hour field 232, a minute field 234, and an AM/PM checkbox 236. The user chooses one of these options and the associated option is performed (step 246 in FIG. 21).

FIG. 25 shows an example of an instance of the Yellow Pages phone book 266. This phone book is displayed when the agent selects tab 194. FIG. 25 shows an example wherein an entry 268 within the phone book has been selected. The associated address information is displayed within the Name & Notes field 203 and the associated phone number is displayed within the Name field 201. The phone number is also displayed within field 126. To dial the number, the user needs only to activate the dial button 43.

Figure 22:
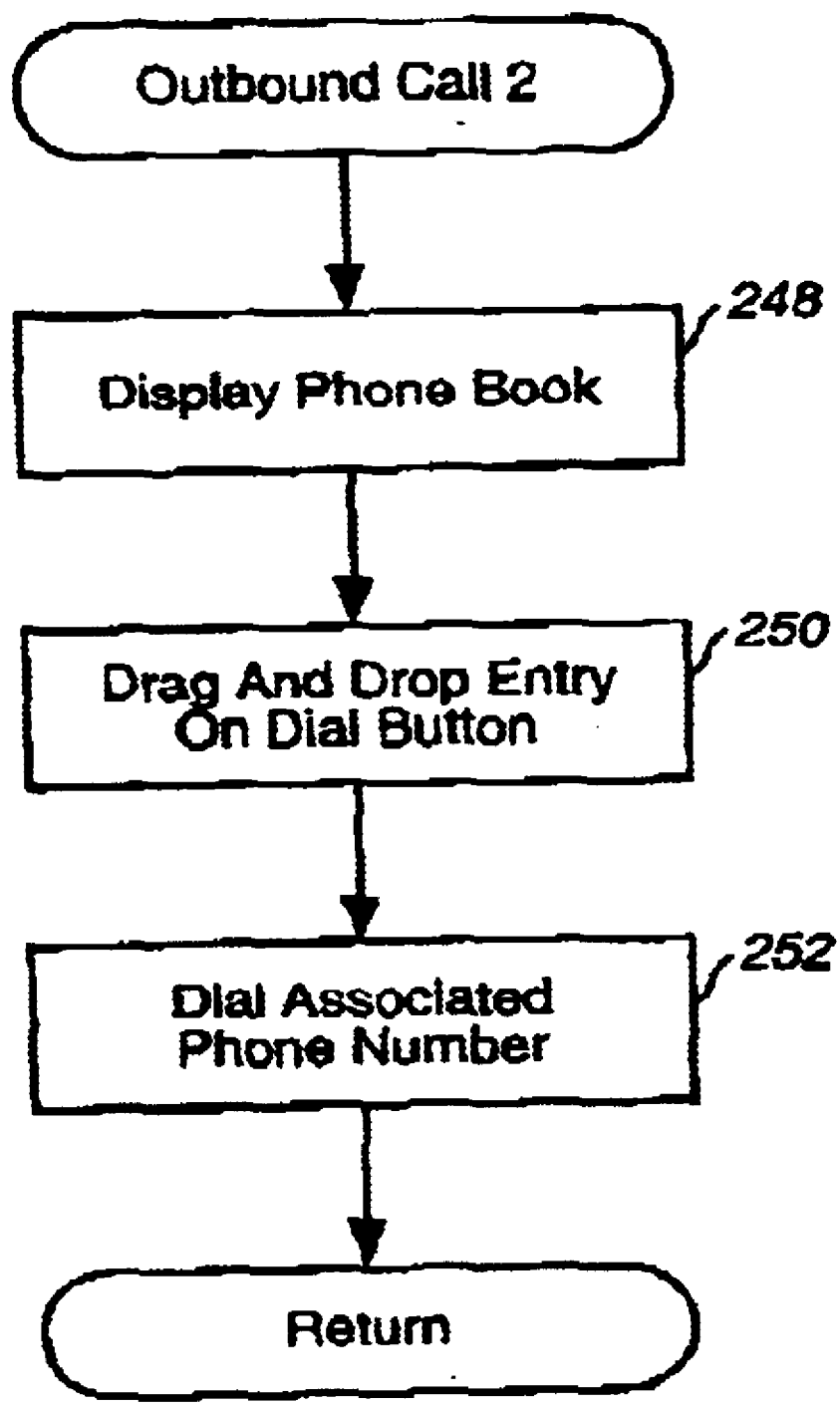
FIG. 22 is a flow chart that shows the steps that are performed to place an outbound call via a drag-and-drop operation.

The above discussion has already illustrated one approach to placing an outbound call. This approach is to choose an entry within a phone book and double click on the entry. FIG. 22 illustrates a second option for placing an outbound call. In the second option, one of the phone books is displayed (step 248 in FIG. 22). The agent then positions a mouse cursor over an entry, drags the entry to be positioned over the dial button 143 and drops the entry (step 250 in FIG. 22). This drag-and-drop operation, causes the phone number that is associated with the entry to be dialed (step 252 in FIG. 22).

Figure 23:
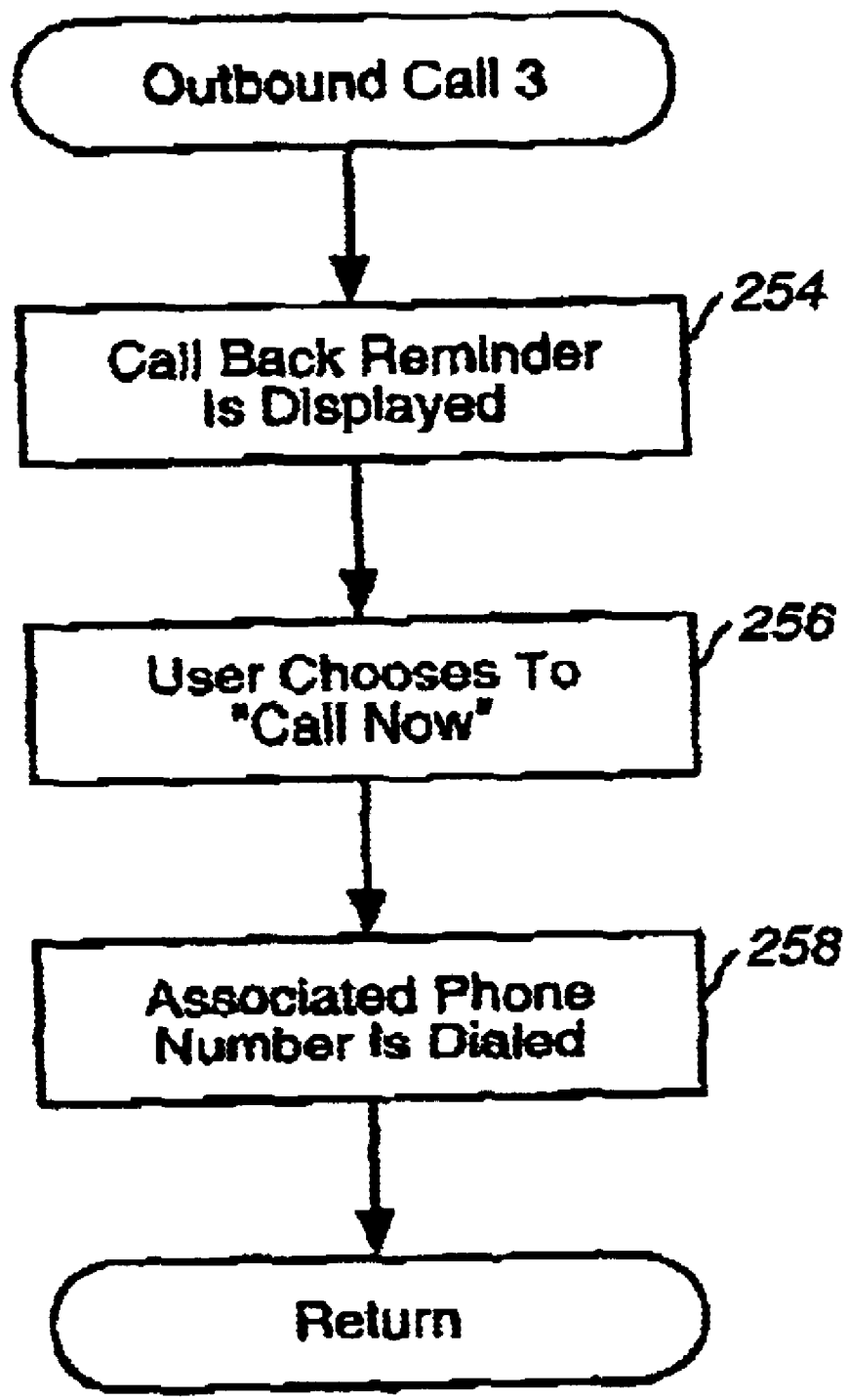
FIG. 23 is a flow chart that illustrates the steps that are performed to place an outbound call via a call back reminder window.

A third means for placing an outbound call concerns a call back. A call back reminder window is displayed (step 254 in FIG. 23). The agent then chooses the callnow option 222 (step 256 in FIG. 23). The phone number associated with the call back is then dialed (step 258 in FIG. 23).

Figure 24:
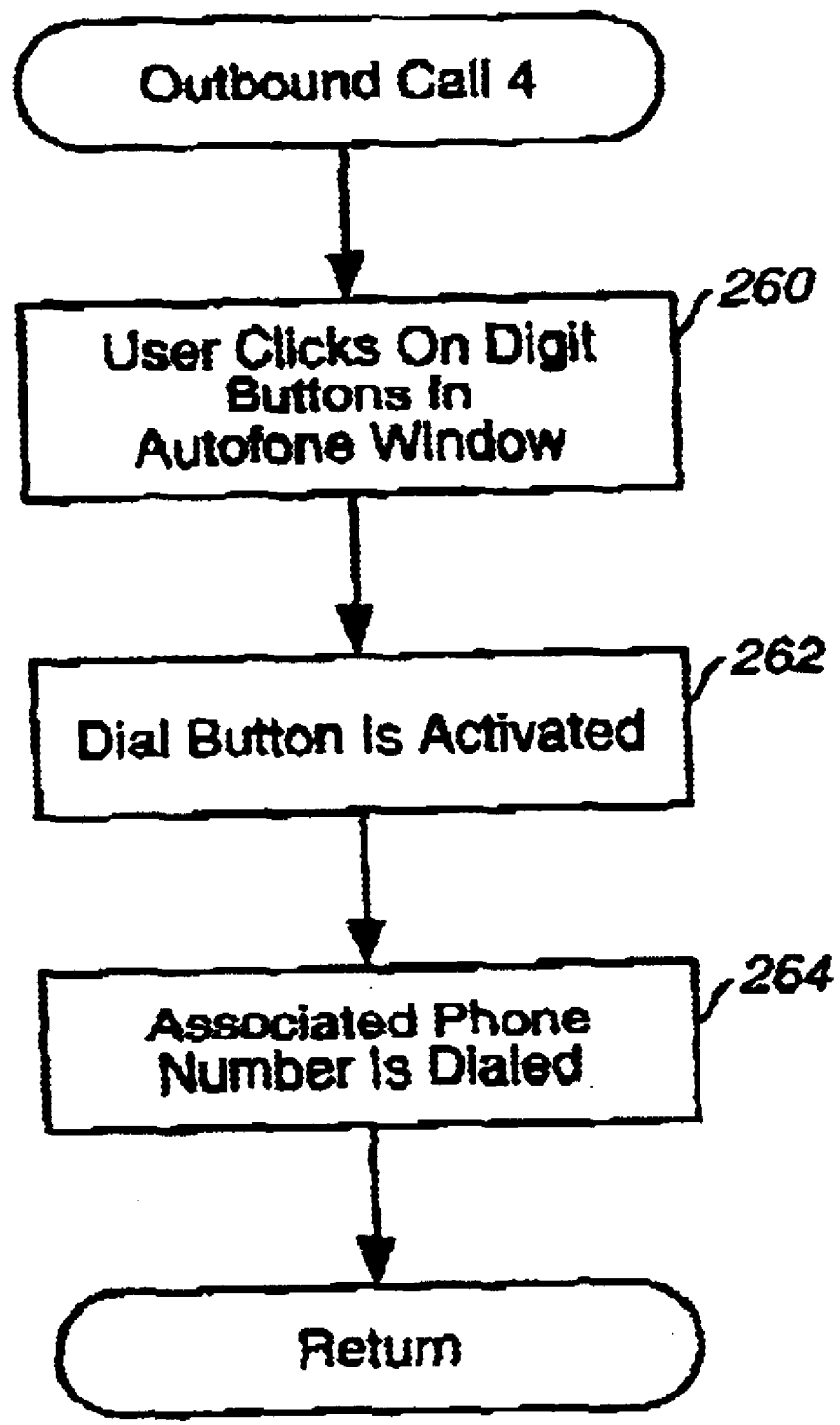
FIG. 24 is a flow chart illustrating the steps that are performed to place an outbound call using the digit buttons in an autofone window.

A fourth option for placing an outbound call is depicted in FIG. 24. The user clicks on the digit buttons within the keypad 120 and a new style window 110 (step 260 in FIG. 24). The user clicks on the digit buttons to specify the phone number to be dialed. The user then activates the dial button 143 (step 262 in FIG. 24). The associated phone number is then dialed (step 264 in FIG. 24).

While the present invention has been described with reference to a preferred embodiment thereof, those skilled in the art will appreciate that various changes in form and detail may be made without departing from the intended scope of the present invention as defined in the appended claims.

What is claimed is:

1. In a computer system having a display device and an interface to telephony resources for placing outbound calls, a method comprising the computer-implemented steps of:

providing a plurality of phone books in the computer system having therein telephone number used for placing outbound calls, wherein the plurality of phone books are at least one of a personal phone books, a yellow pages phone book and a call backs phone book;

providing for at least one scheduled calling time to be associated with at least one of the telephone numbers;

providing an interface on the display by which an agent may input the scheduled calling time associated with the at least one telephone number; and providing an option for postponing a call back time on the display when the scheduled calling time arrives, wherein the agent can select to perform the call back in a predetermined number of minutes from the scheduled calling time.

2. The method of claim 1 further comprising the step of:

displaying a prompt on the display when the schedule calling time arrives, whereby the agent is prompted to call the telephone number with which the scheduled calling time is associated.

3. The method of claim 2 further comprising the step of:
providing on the display at the time the prompt is displayed, an interface by which the agent may cause the telephony resources to place an outbound call to the telephone number with which the scheduled calling time is associated.

4. The method of claim 2, wherein the prompt is a reminder window.

5. The method of claim 3, further comprising displaying status information associated with the outbound call.

6. The method of claim 3, further comprising allowing at least one of editing and deleting of information associated with the telephone numbers.

7. A computer system having a display device and an interface to telephony resources for placing outbound calls comprising:
mean for providing a plurality of phone books in the computer system having therein telephone number used for placing outbound calls, wherein outbound calls wherein the plurality of phone books are at least one of a personal phone book, a yellow pages phone book and a call backs phone book;
means for providing for at least one scheduled calling time to be associated with at least one of the telephone numbers;
means for providing an interface on the display by which an agent may input the scheduled calling time associated with the at least one telephone number; and
means for providing an option for postponing a call back time on the display when the scheduled calling time arrives, wherein the agent can select to perform the call back in a predetermined number of minutes from the scheduled calling time.

8. The system of claim 7, further comprising means for displaying a prompt on the display when the scheduled calling time arrives, whereby the agent is prompted to call the telephone number with which the scheduled calling time is associated.

9. The system of claim 8, further comprising means for providing on the display at the time the prompt is displayed an interface by which the agent may cause the telephone resources to place an outbound call to the telephone with which the scheduled calling time is associated.

10. The system of claim 8, wherein the prompt is a reminder window.

11. The system of claim 9, further comprising means for displaying status information associated with the outbound call.

12. The system of claim 9, further comprising means for allowing at least one of editing and deleting of information associated with the telephone numbers.

13. A computer system having a display device and an interface to telephony resources for placing outbound calls comprising:
a plurality of phone books in the computer system having therein telephone numbers used for placing outbound calls, wherein the plurality of phone books are at least one of a personal phone book, a yellow pages phone book and a call backs phone book;
a scheduled calling time association interface that provides for at least one scheduled calling time to be associated with at least one of the telephone numbers;
an interface on the display by which an agent may input the scheduled calling time associated with the at least one telephone number; and
a postponing interface that provides an option for postponing a call back time on the display when the scheduled calling time arrives, wherein the agent can select to perform the call back in a predetermined number of minutes from the scheduled calling time.

14. The system of claim 13, further comprising a prompt displayed on the display when the scheduled calling time arrives, whereby the agent is prompted to call the telephone number with which the scheduled calling time is associated.

15. The system of claim 14, further comprising an outbound call interface by which the agent may cause the telephone resources to place an outbound call to the telephone with which the scheduled calling time is associated.

16. The system of claim 14, wherein the prompt is a reminder window.

17. The system of claim 15, further comprising a status information portion of the display associated with the outbound call.

18. The system of claim 15, further comprising an edit interface that allows at least one of editing and deleting of information associated with the telephone numbers.

* * * * *